United States Patent [19]
Yevick

[11] 4,173,399
[45] Nov. 6, 1979

[54] COMPACT OPTICAL VIEWER FOR MICROFICHE OR CASSETTE

[75] Inventor: George J. Yevick, Leonia, N.J.

[73] Assignee: Izon Corporation, New York, N.Y.

[21] Appl. No.: 854,001

[22] Filed: Nov. 22, 1977

Related U.S. Application Data

[63] Continuation-in-part of Ser. No. 717,858, Sep. 13, 1976, abandoned.

[51] Int. Cl.² .............................................. G03B 21/28
[52] U.S. Cl. .......................................... 353/78; 353/38
[58] Field of Search ...................... 353/34, 38, 33, 77, 353/78, 81, 98, 99, 119, 122

[56] References Cited

U.S. PATENT DOCUMENTS

| | | | |
|---|---|---|---|
| 3,667,839 | 6/1972 | Artaud | 353/77 |
| 3,920,322 | 11/1975 | Peters | 353/78 |

Primary Examiner—Harry N. Haroian
Attorney, Agent, or Firm—Daniel M. Rosen

[57] ABSTRACT

A compact microfiche reader. Light from a microfiche or cassette microfilm is projected and undergoes several reflections prior to striking a viewing screen. One of the reflecting surfaces is defined by a prism sheet having a multiplicity of prisms. Light is both reflected by and passes through the prism sheet, the prism sheet thus defining a dual-function optical surface. This makes possible a more compact viewer. Several embodiments employ foldable reflecting surfaces and a foldable viewing screen to further reduce the size of the reader.

19 Claims, 37 Drawing Figures

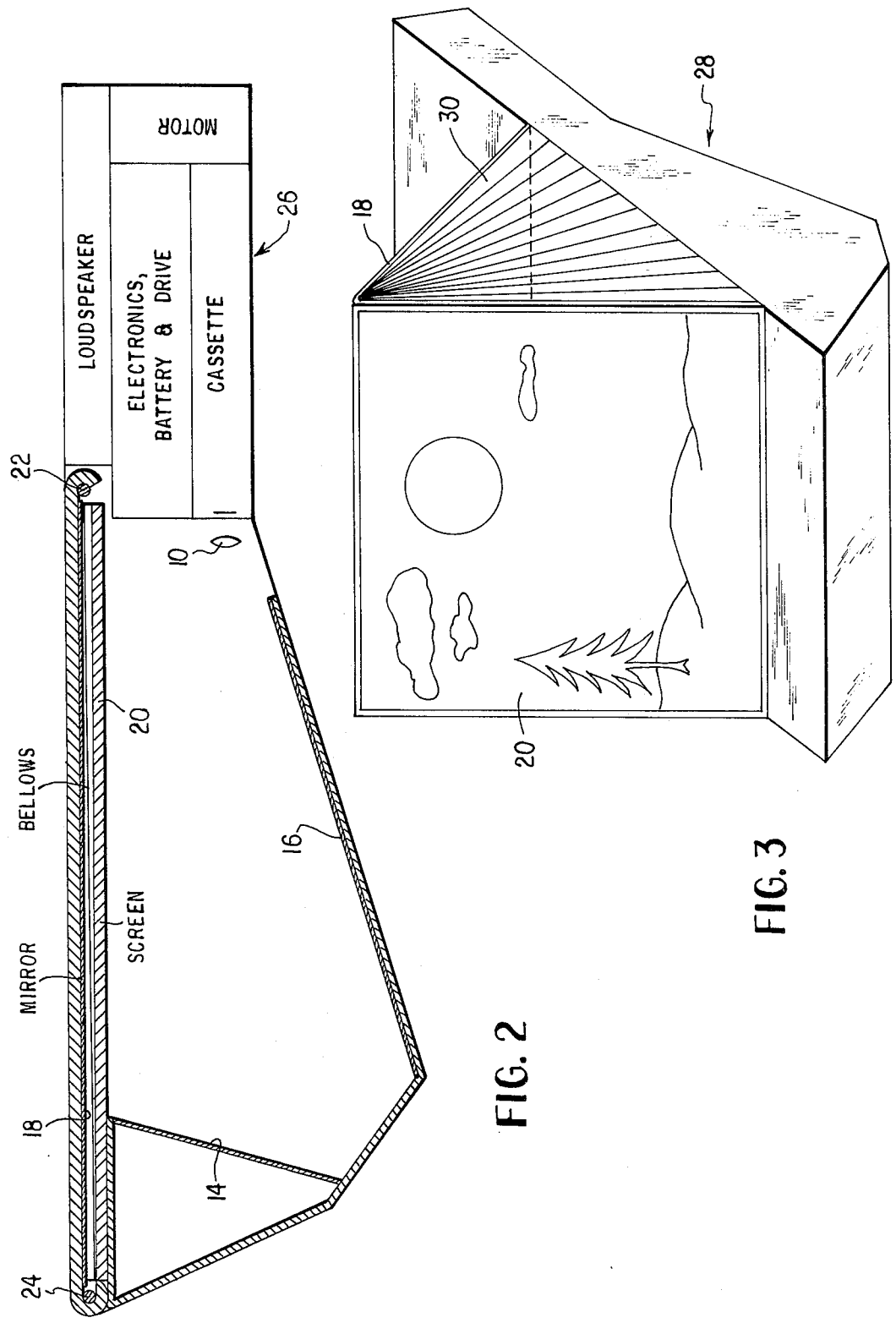

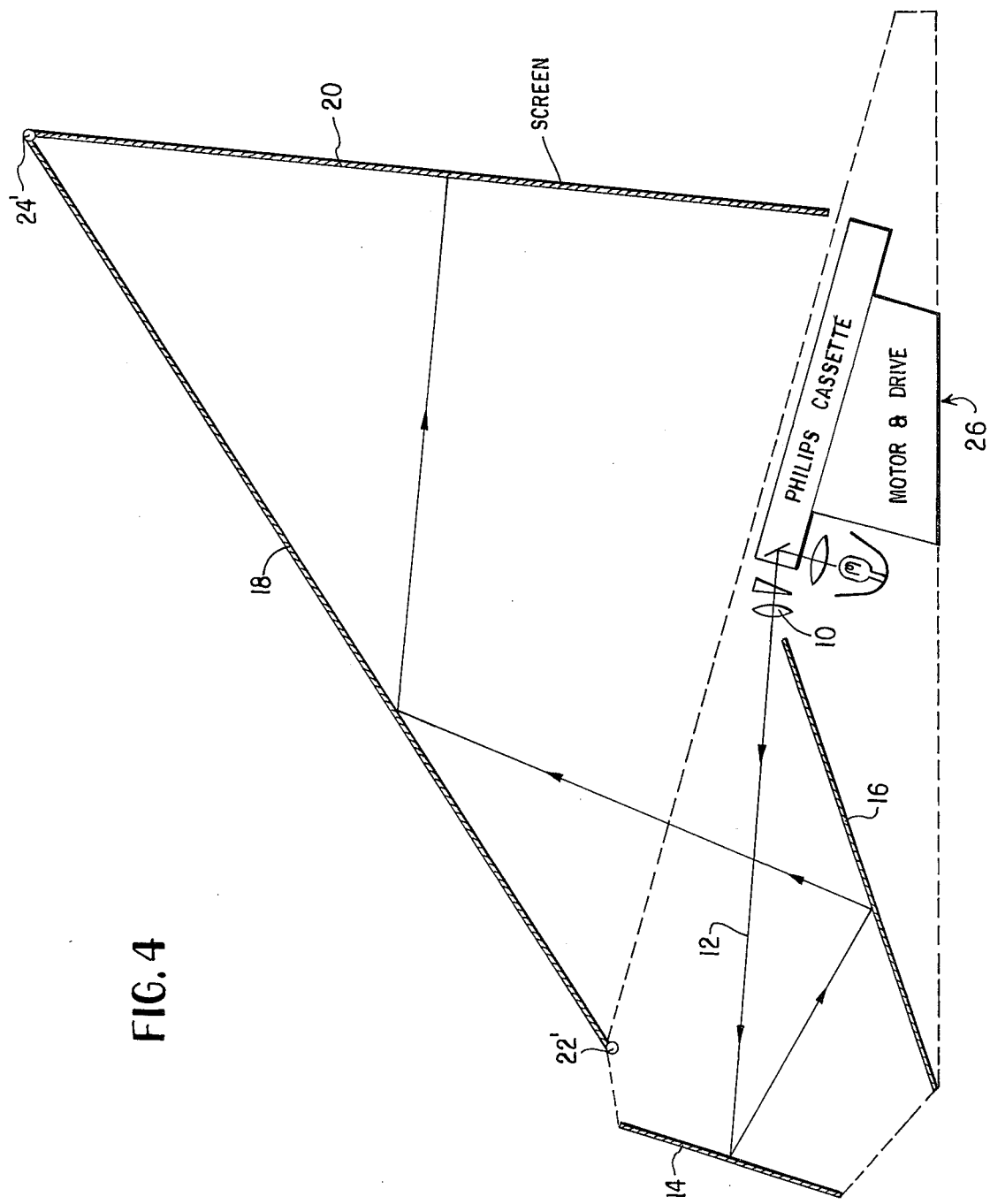

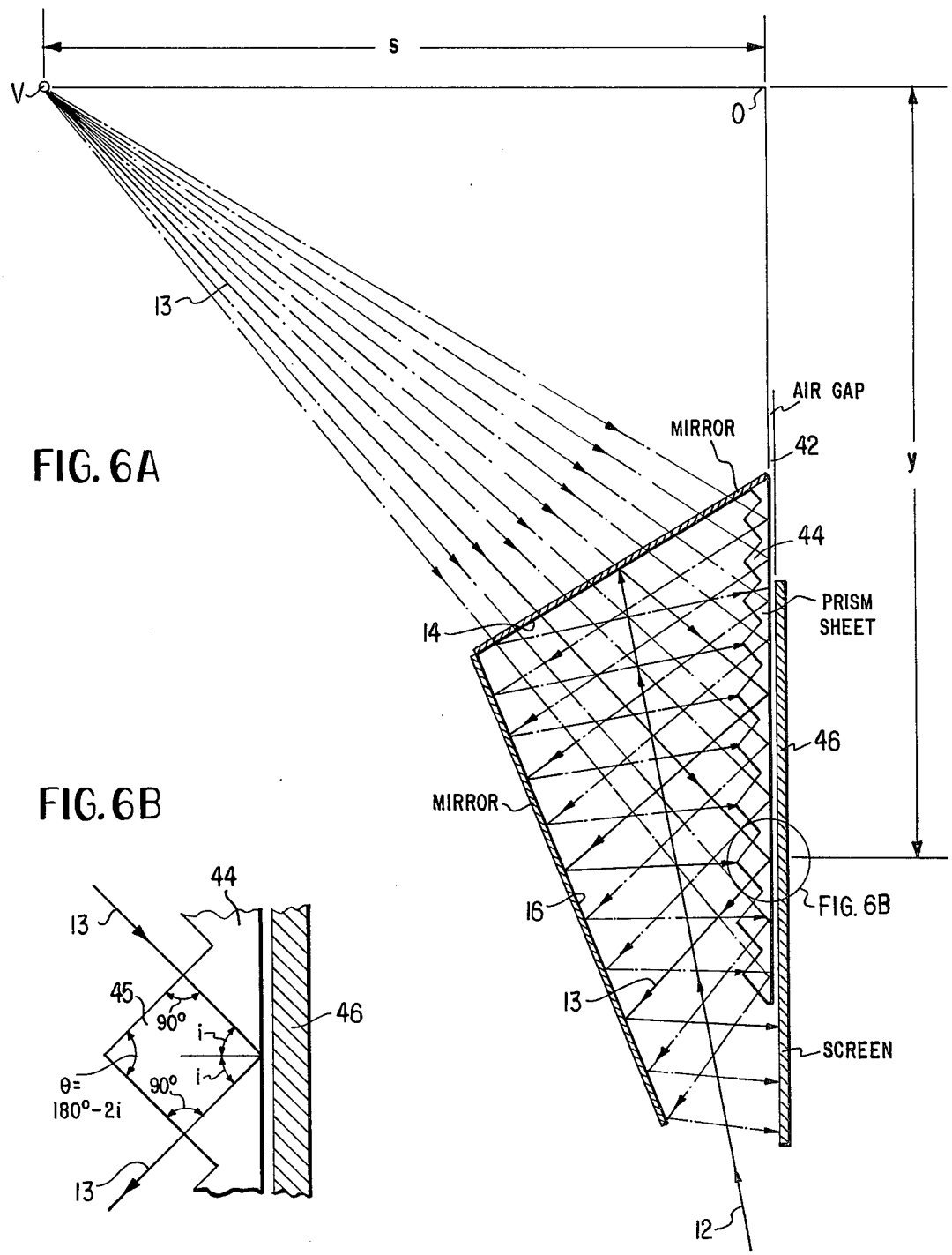

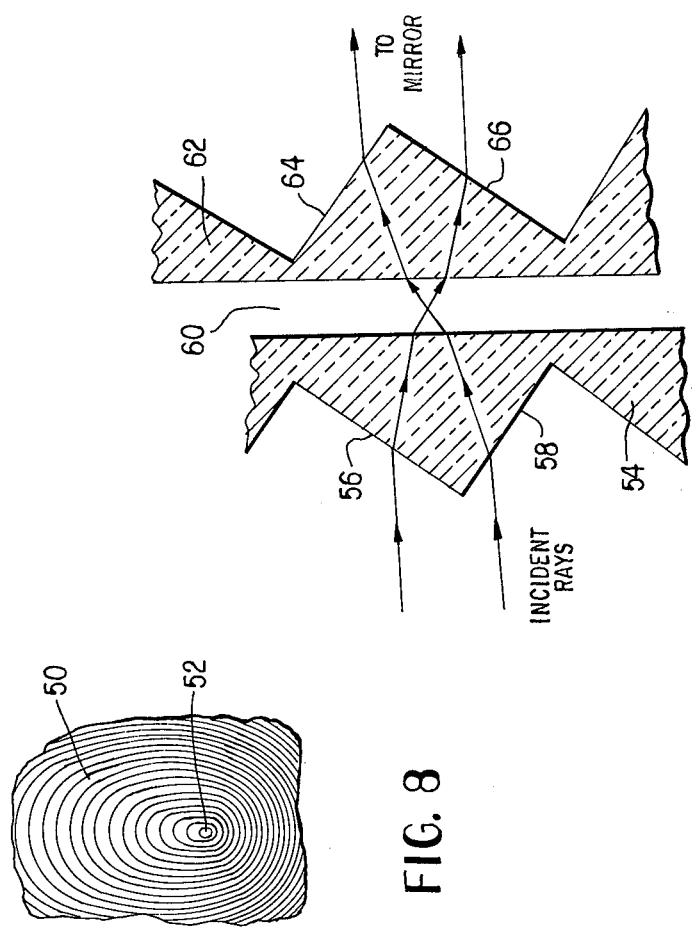
FIG. 9a
FIG. 8
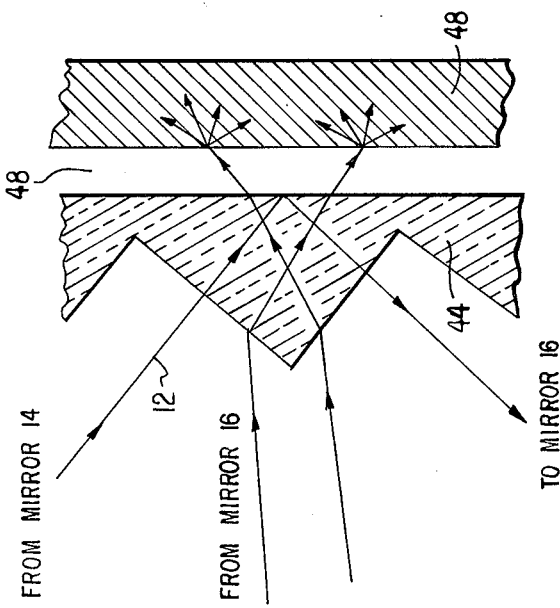
FIG. 7

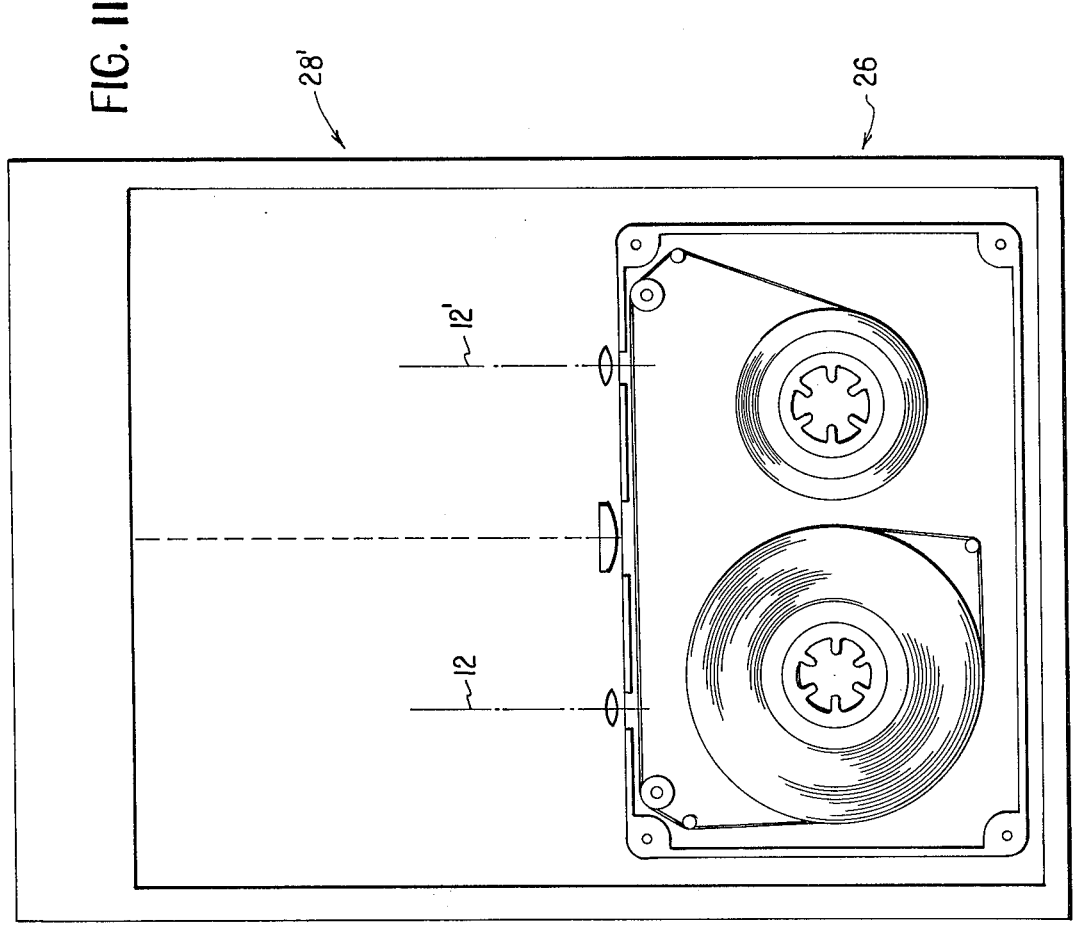
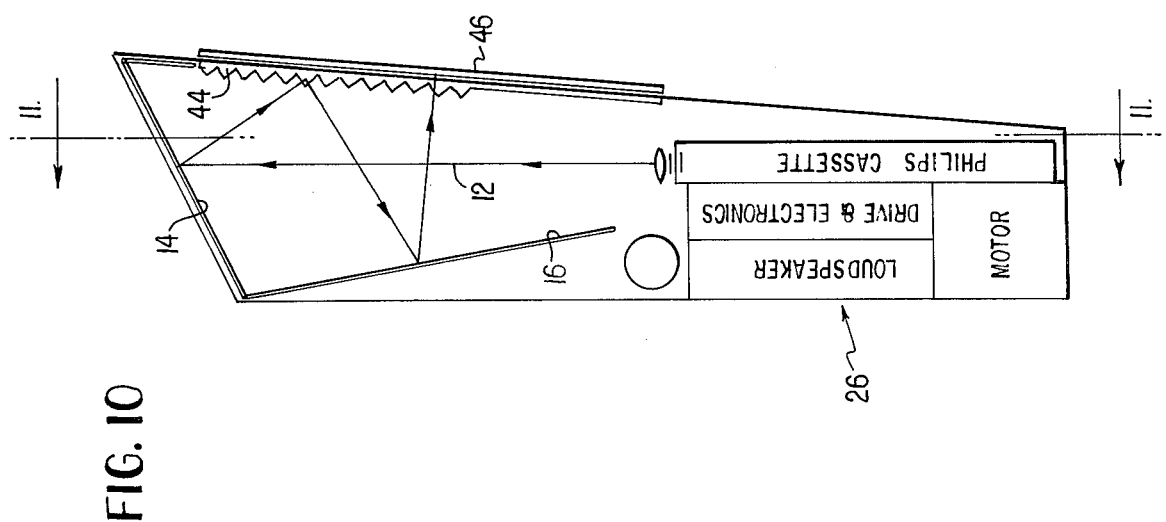

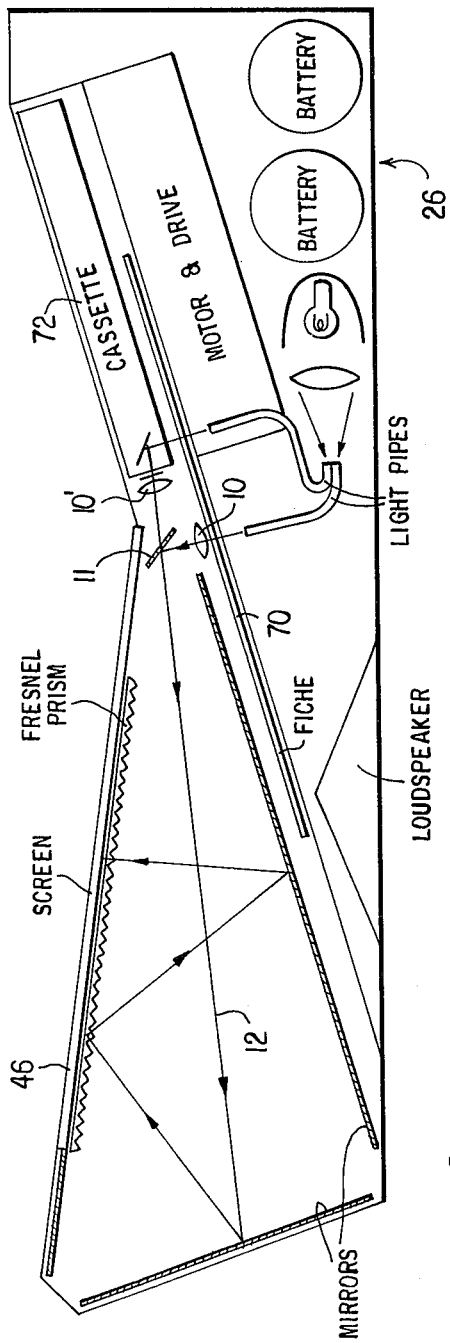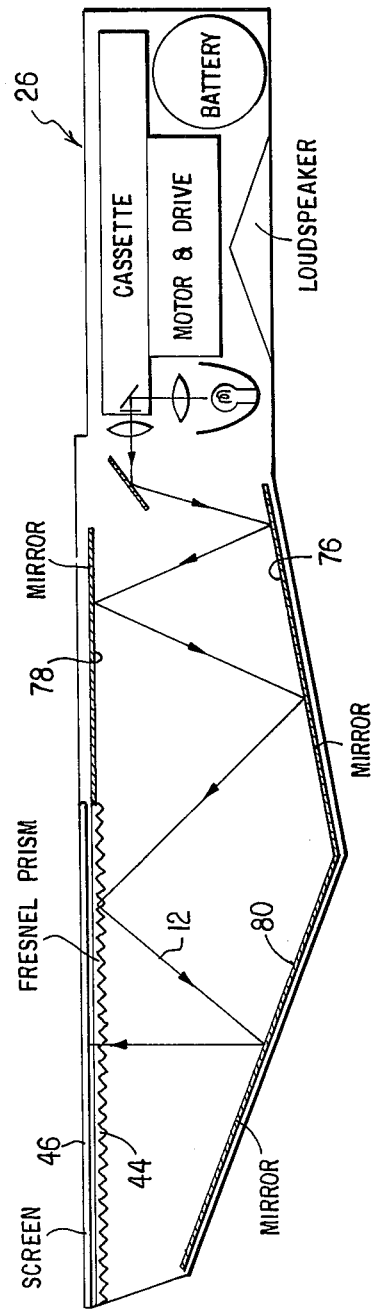
FIG. 12
FIG. 13

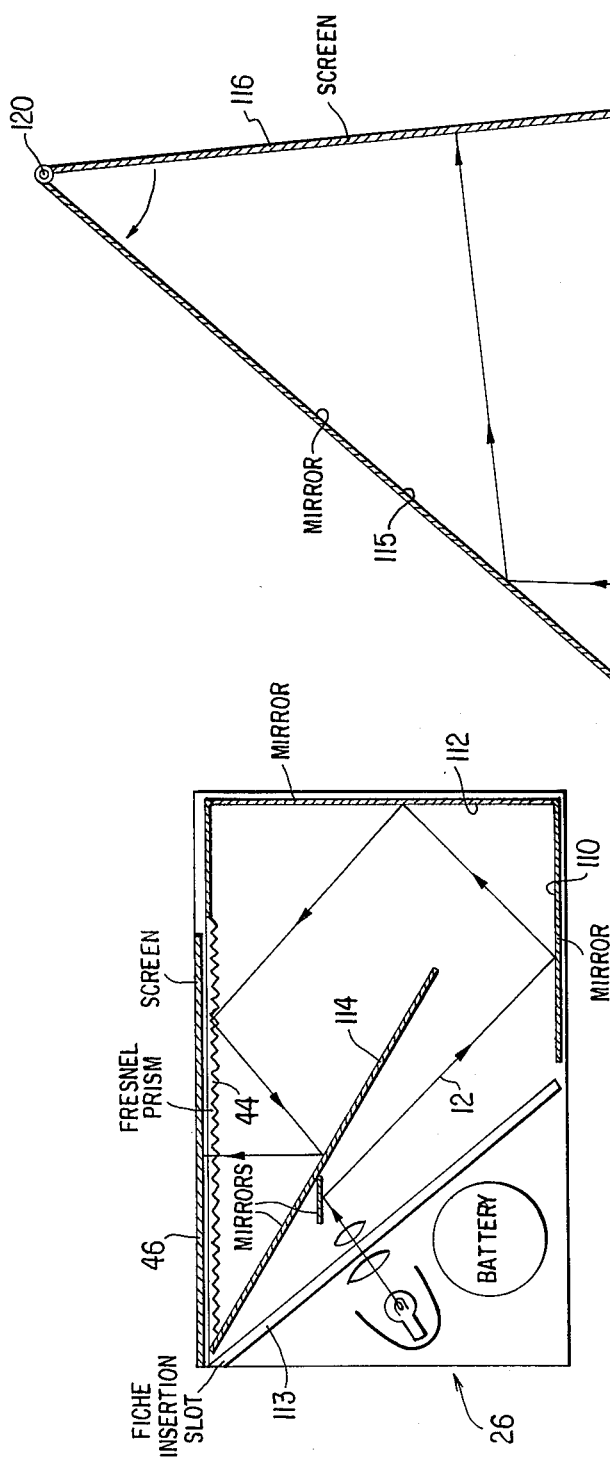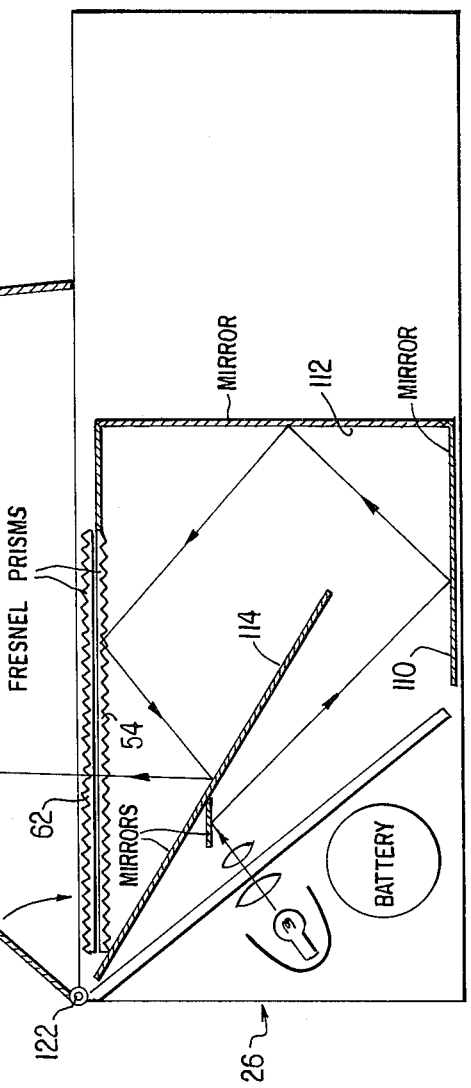
FIG. 18
FIG. 19

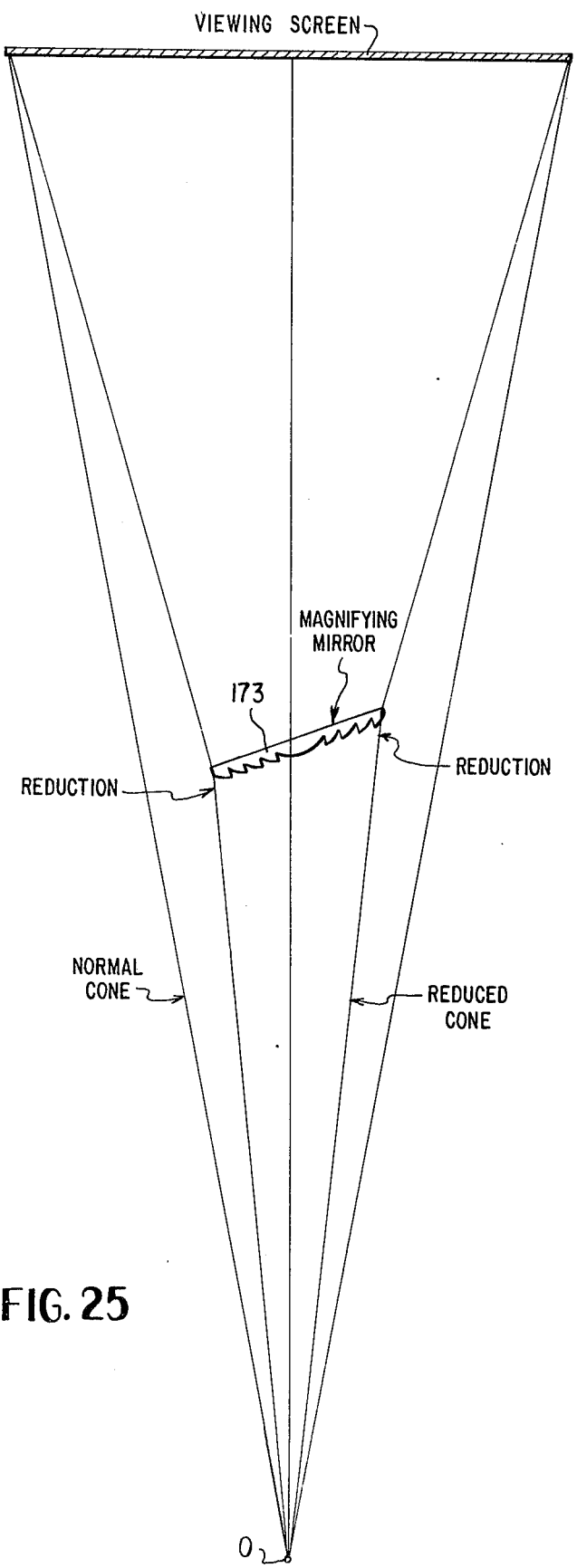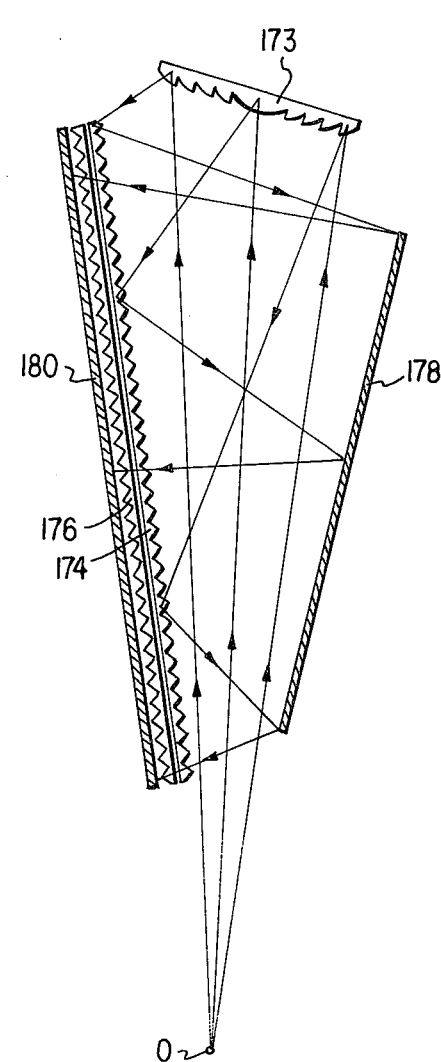
FIG. 25
FIG. 26

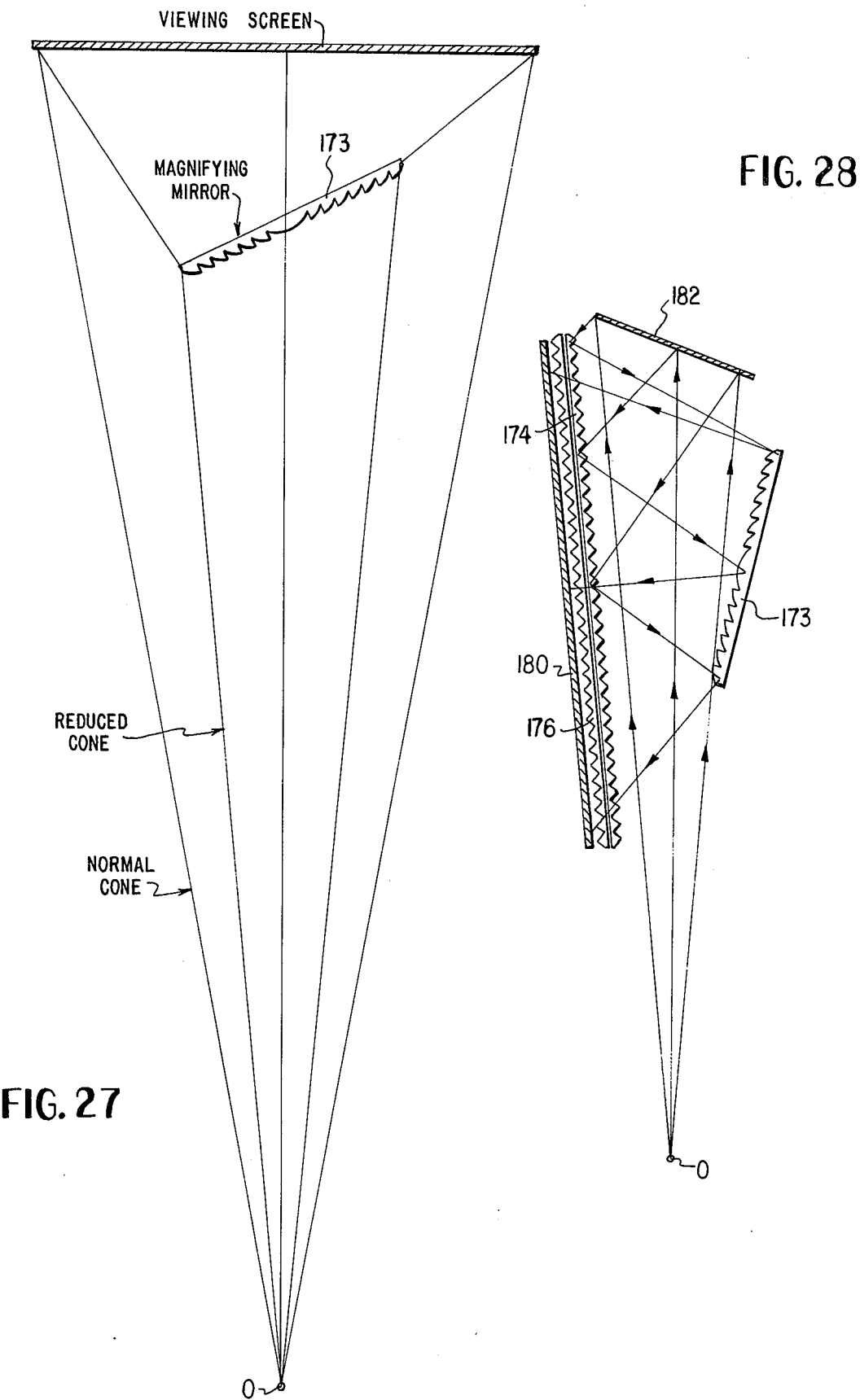

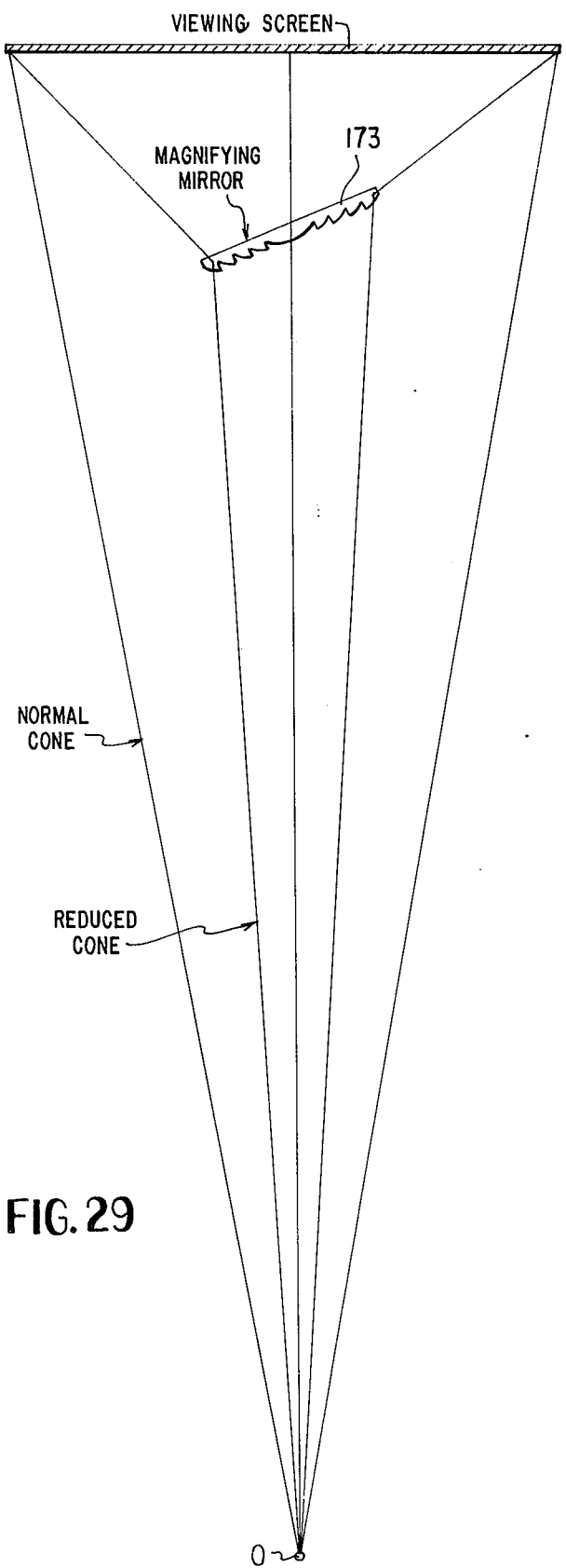
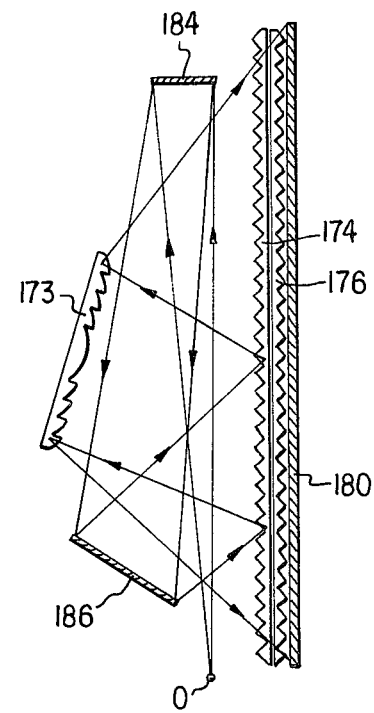

FIG. 31
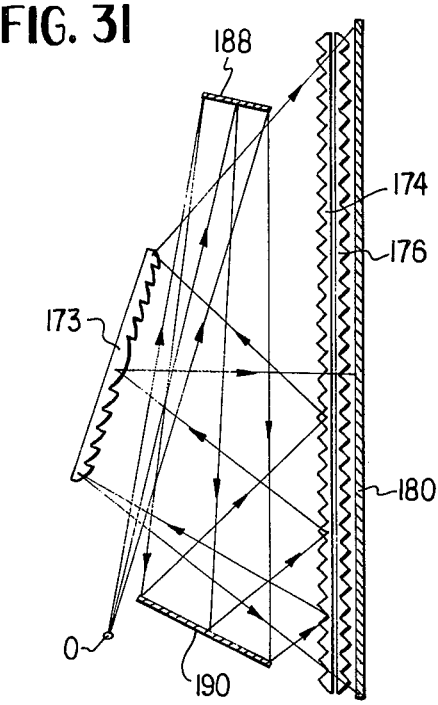
FIG. 32
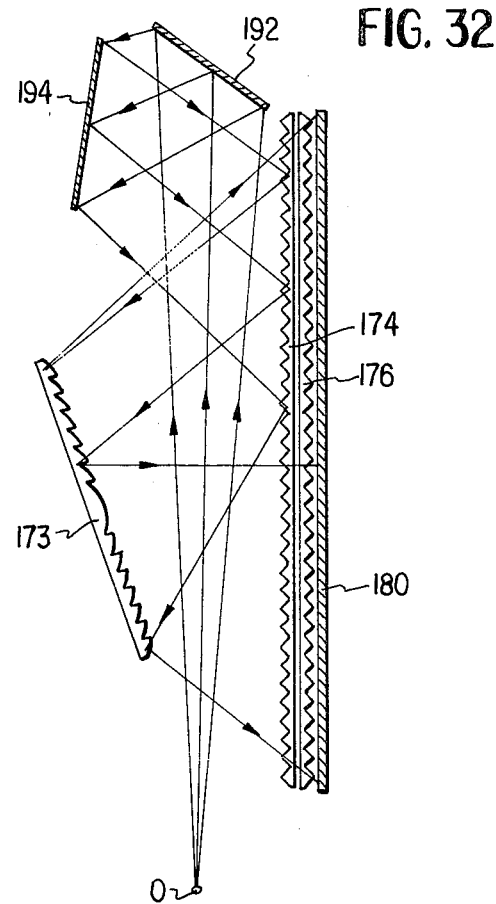
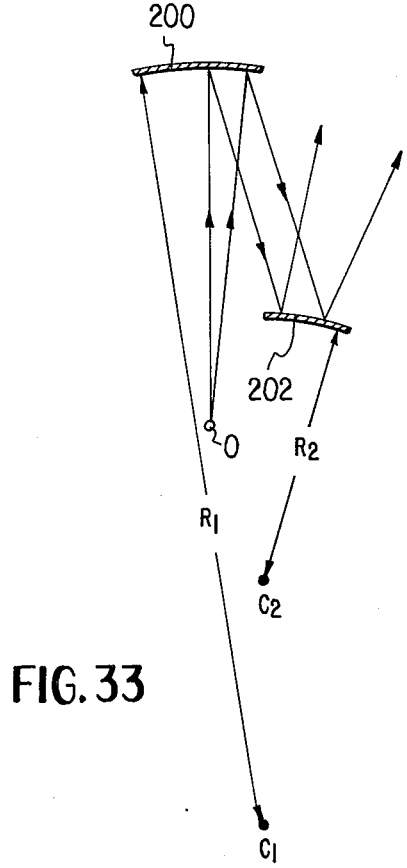
FIG. 33
FIG. 34
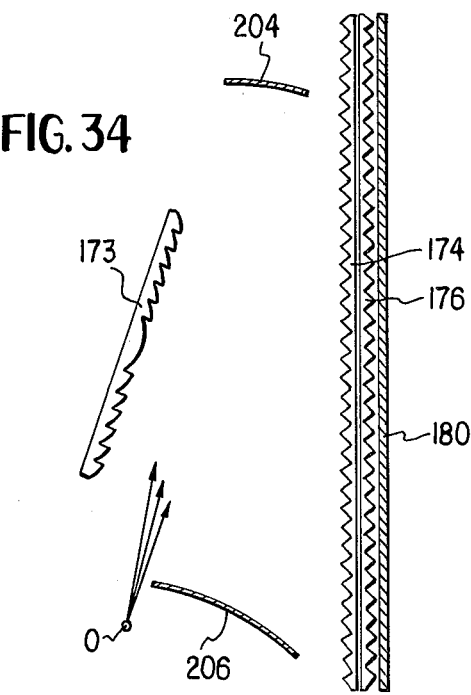

COMPACT OPTICAL VIEWER FOR MICROFICHE OR CASSETTE

This is a continuation-in-part application of my co-pending application entitled "COMPACT OPTICAL VIEWER MICROFICHE OR CASSETTE", Ser. No. 717,858, filed Sept. 13, 1976, now abandoned.

This invention relates to a microfiche reader, and more particularly to a compact microfiche reader wherein the projected microimages of a microfiche are reflected several times prior to striking a viewing screen. Many of the embodiments of this invention represent an improvement on the device shown in U.S. Pat. No. 3,941,467 issued to Kapany et al, hereby incorporated by reference. As set out in that patent, a microfiche reader folds a projected, conical beam of light by causing the beam to be successively reflected against a plurality of reflecting surfaces until it strikes at a viewing screen. The plurality of reflecting surfaces is defined by the several exterior faces of a solid. The solid is of a shape termed a trapezium. One of the reflecting surfaces of the trapezium performs a dual function. It forms one of the reflecting surfaces and additionally permits subsequently reflected light to pass through it for final imaging on a viewing screen. The manner chosen by Kapany et al in accomplishing this result resides in the selection of certain angles of the reflecting surfaces so that rays of light initially striking the dual-function surface do so at an angle of incidence greater than a certain critical angle for total internal reflection. The critical angle is, in turn dependent upon the index of refraction of the material from which the trapezium is fashioned. The Kapany et al construction also utilizes a Fresnel lens which is not essential for the operation of the device, but is apparently utilized only to give a brighter and more uniformly illuminated picture, particularly at the edges.

According to the practice of this invention a similar action takes place in that a light cone is effectively folded several times before striking a viewing screen, yet, there is no requirement that a solid trapezium or other block of light transmitting material be employed. Instead, a similar dual-function surface is defined by a series of prisms which define a prism sheet. The prism sheet performs the same function as a dual-function surface of Kapany, and additionally acts to focus the final image on a viewing screen. One advantage exhibited by this invention over the construction of Kapany et al is that significant weight and cost savings are realized. Thus, in lieu of a relatively heavy and expensive solid plastic block (the trapezium), reflecting surfaces are defined by planar mirrors in sheet or panel form which may be inexpensively fashioned and positioned relative to each other.

Still further, the use of a solid block of transparent material requires a longer light cone throwing distance for the same sized viewing area. Thus, for a solid block of transparent material of index of refraction n, the throwing distance is n times the throwing distance required by the practice of this invention. For example, if a Kapany et al type of viewer has a throwing distance of nine inches, using polymethylmethacrylate (n=1.5) as the material for the trapezium, the practice of this invention admits of a throwing distance of about six inches. A lesser throwing distance yields a viewer still more compact for a given size viewing screen.

In the drawings:

FIG. 2 is a partially schematic view of the device of FIG. 1 in its folded condition.

FIG. 3 is a perspective view of the viewer of FIGS. 1 and 2 when in the open position.

FIG. 4 is a view similar to FIG. 1 and illustrates a modification.

Figure 5:
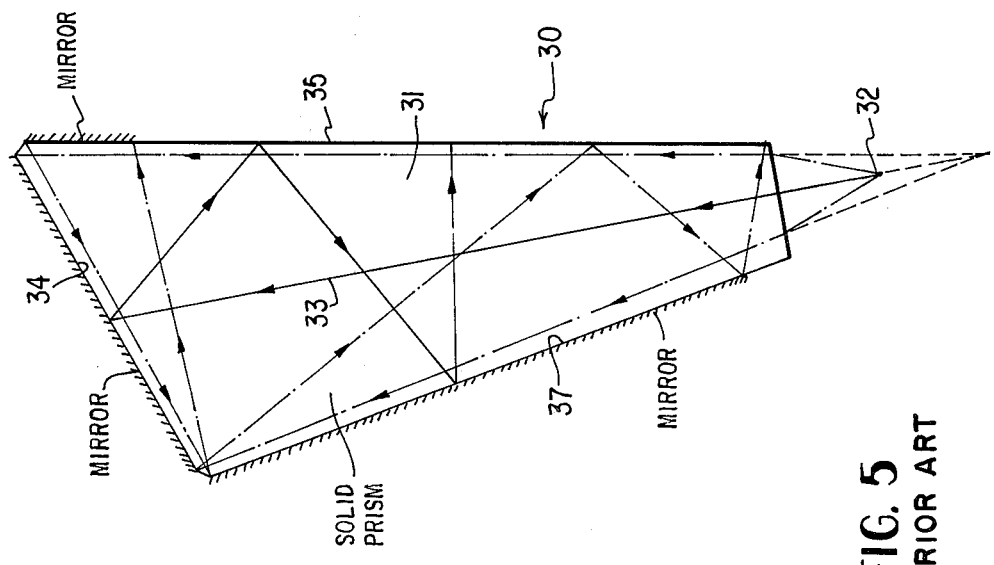

FIG. 5 is a view illustrating the device shown in U.S. Pat. No. 3,941,467 issued to Kapany et al.

Figure 1:
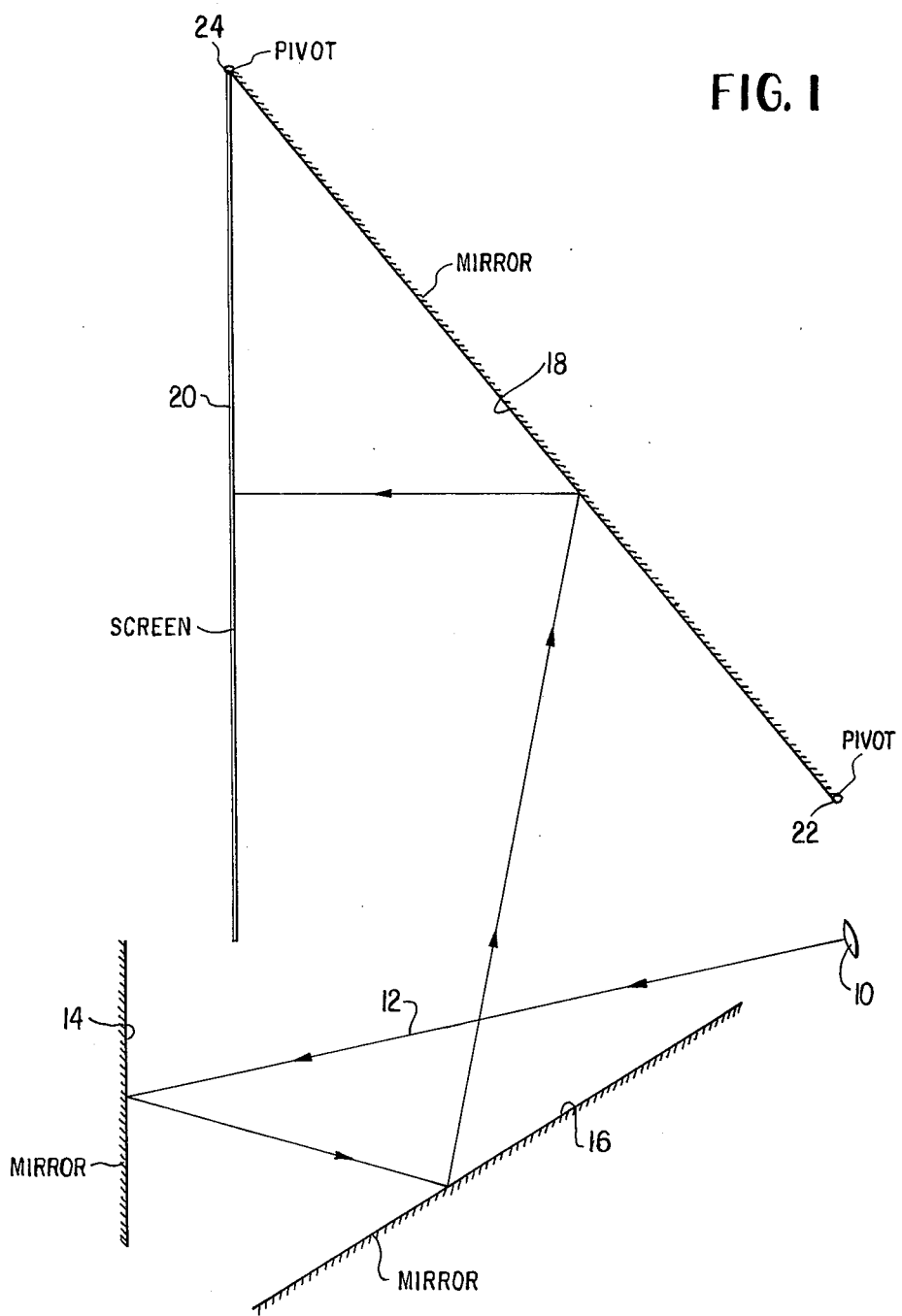
FIG. 1 is a schematic view of a simple folded mirror configuration according to the practice of this invention.
Figure 6:
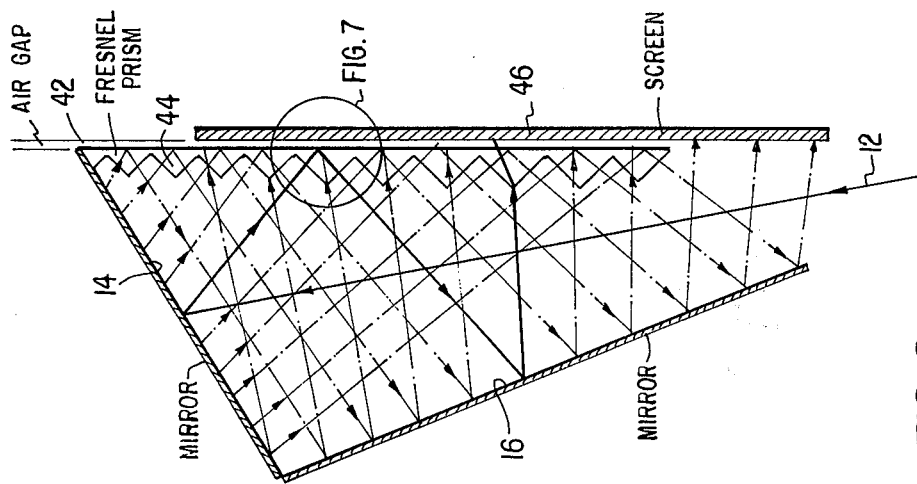

FIG. 6 is a view similar to FIG. 1 but illustrates an embodiment employing a prism sheet which performs a dual function.

FIG. 6a is a view similar to FIG. 6 and illustrates the variation in apex angle of the apices of the prism sheet 44 of FIG. 6.

FIG. 6b is an enlarged view of portion 6b of FIG. 6a.

FIG. 7 is a magnified portion of the screen and prism sheet.

FIG. 8 is a view illustrating a modification of a prism sheet.

FIG. 9a is a view similar to FIG. 7 and illustrates the use of two prism sheets if a mirror immediately follows in the optical path of the first prism sheet.

Figure 9B:
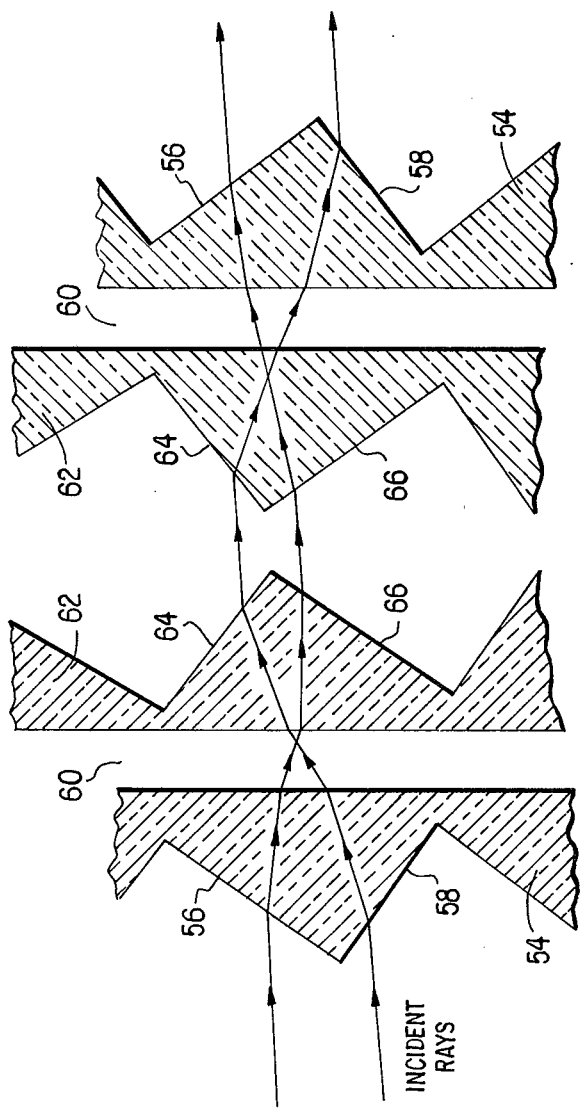

FIG. 9b is a view similar to FIG. 9a and illustrates the use of a second pair of prism sheets.

FIG. 10 is a view similar to FIG. 2 and illustrates a complete viewer constructed according to the principles shown at FIG. 6.

FIG. 11 is a partially schematic sectional view of FIG. 10 taken along section 11—11 and illustrates two lenses for projecting microimages based on two parallel tracks located on a Philips cassette film strip.

FIG. 12 is a partially schematic view similar to FIG. 10 and shows a reader exhibiting compatability for both a Philips cassette and a standard four inch by six inch microfiche.

FIG. 13 is a partially schematic view illustrating another embodiment of the invention.

Figure 14:
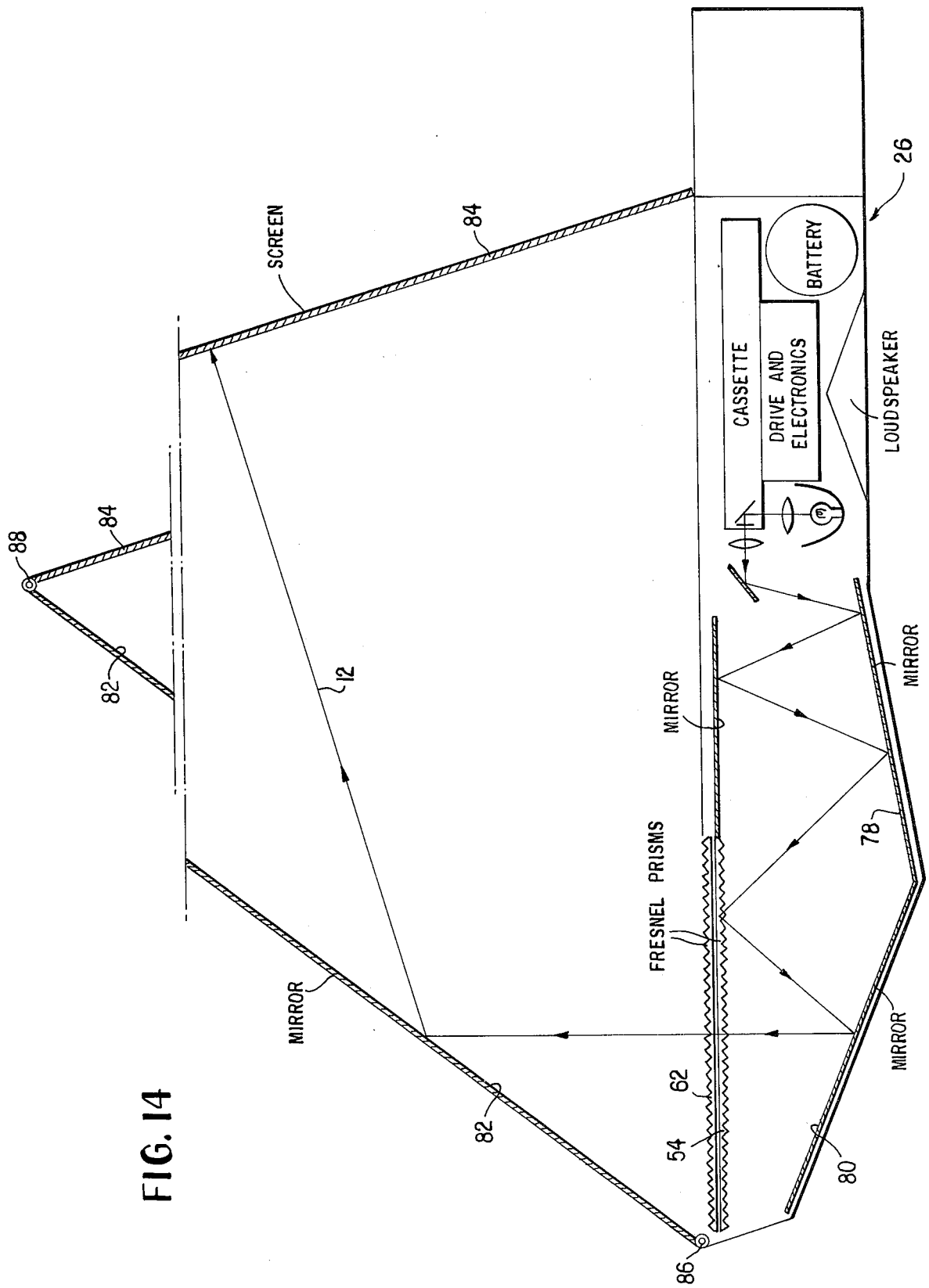

FIG. 14 is a view illustrating the open position of the device shown at FIG. 13.

Figure 15:
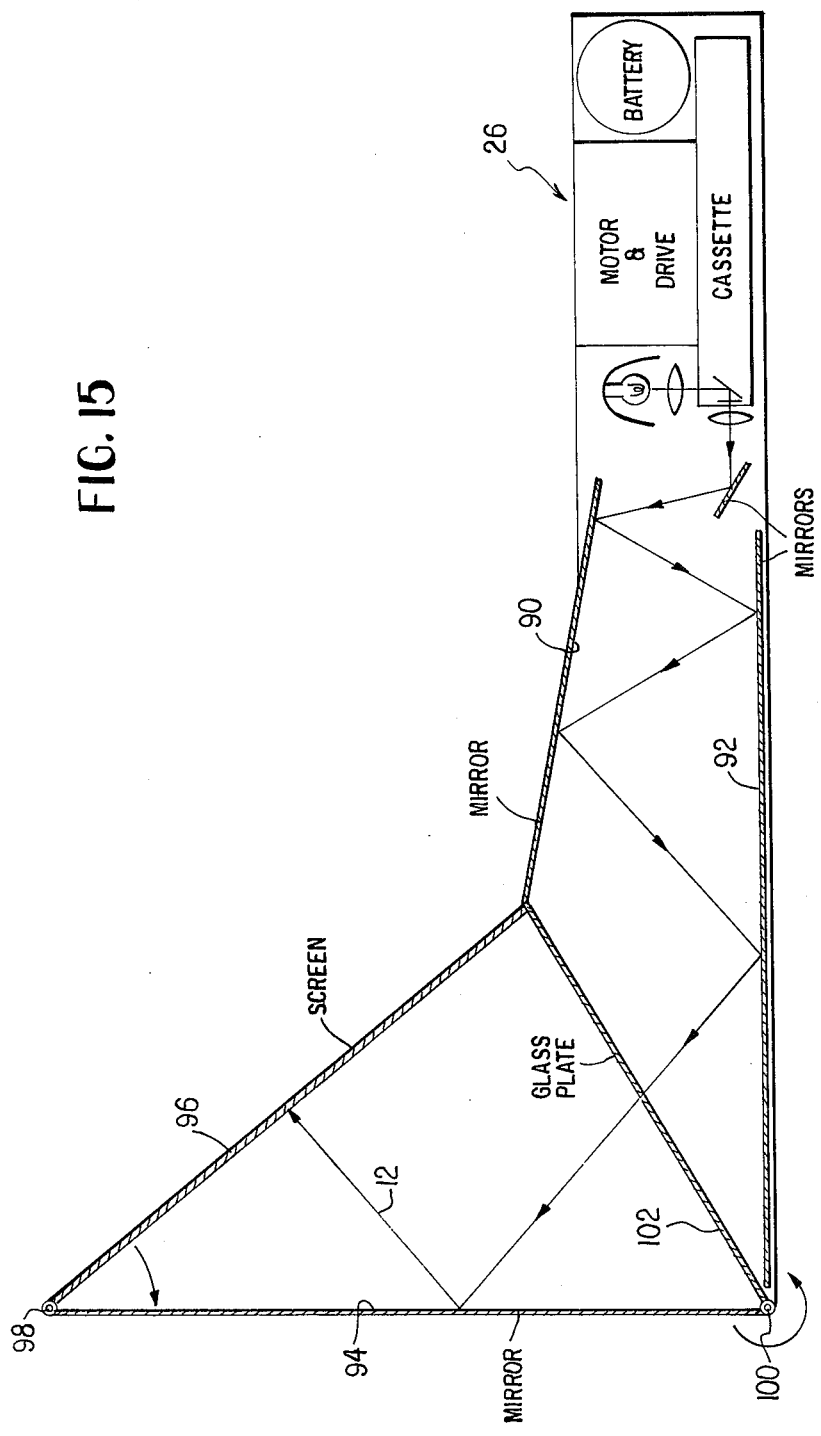

FIG. 15 is a view illustrating still another modification of the invention.

Figure 16:
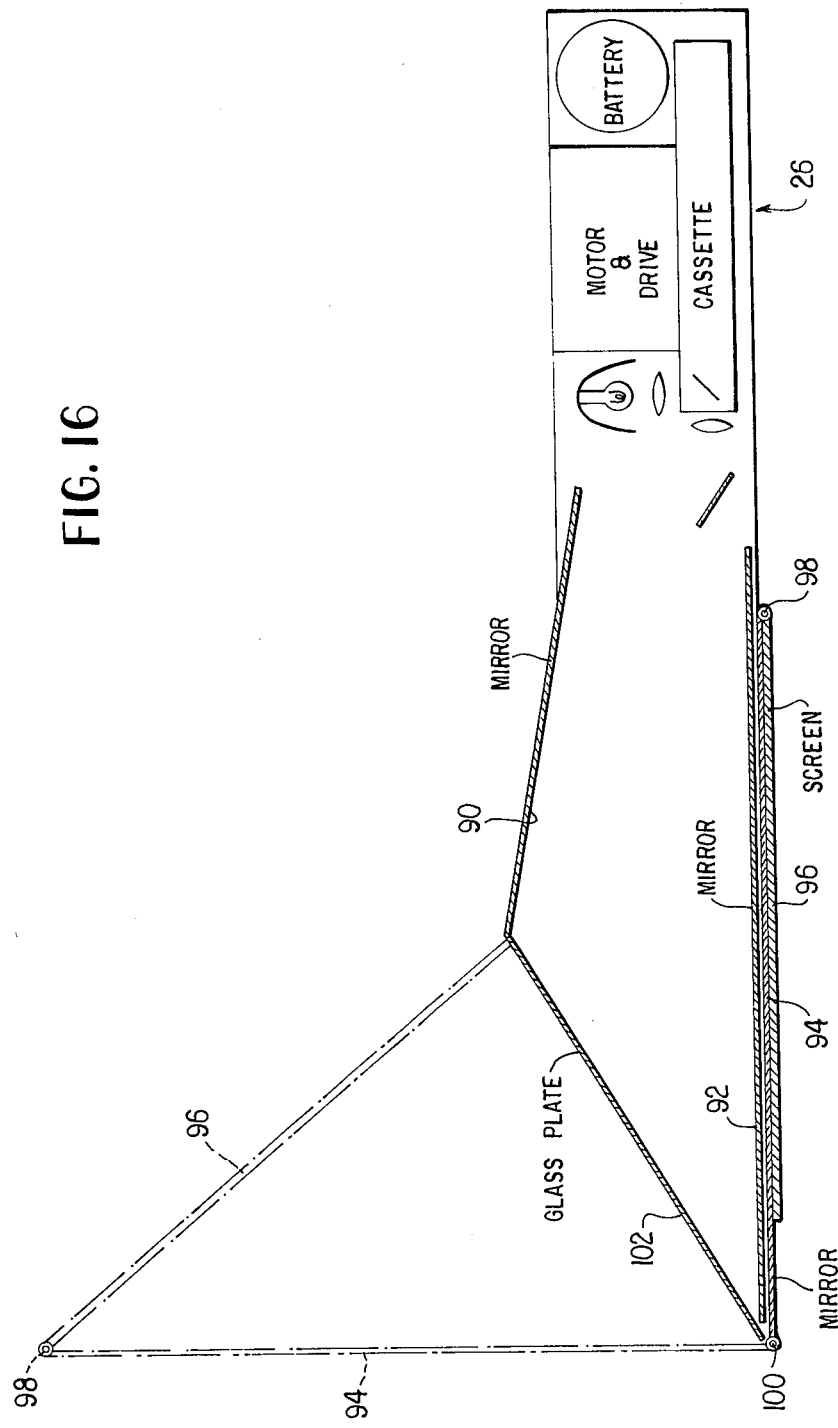

FIG. 16 is a view of the device of FIG. 15 when in the folded position.

Figure 17:
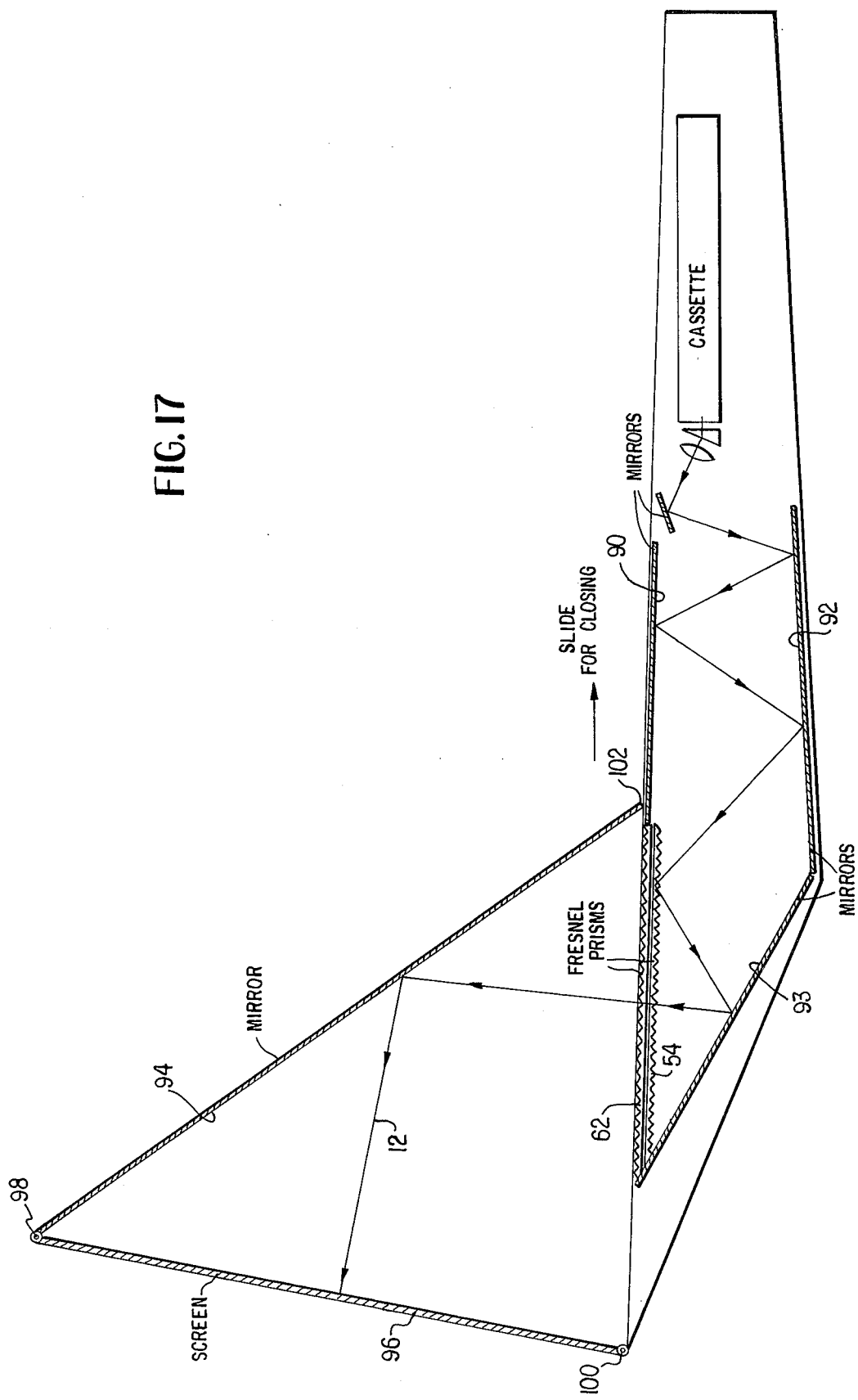

FIG. 17 shows a viewer of the same type as illustrated at FIG. 15, except that the folding of the viewing screen and a mirror is different.

FIG. 18 represents still another embodiment.

FIG. 19 is a view of the reader shown at FIG. 18 with the addition of a mirror and folding viewing screen.

Figure 20:
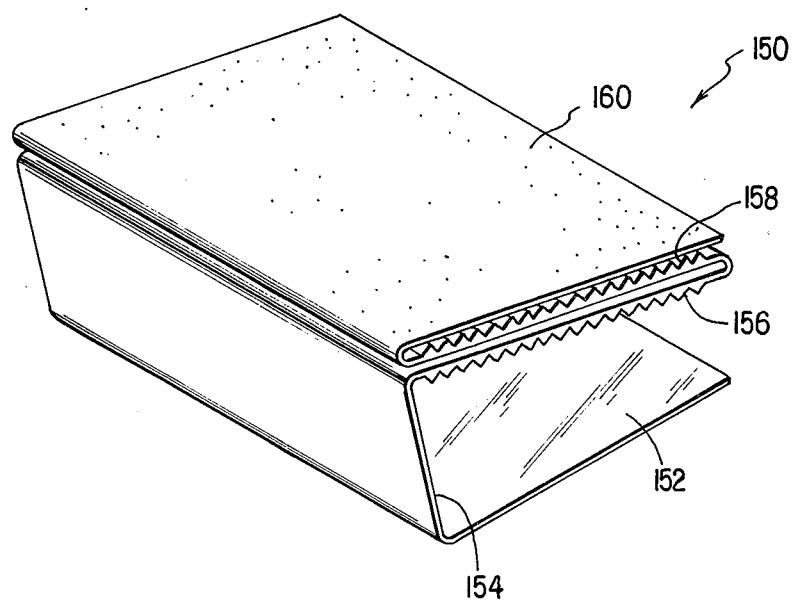

FIG. 20 is a perspective view of a one-piece reflector and prism sheet assmebly.

Figure 21:
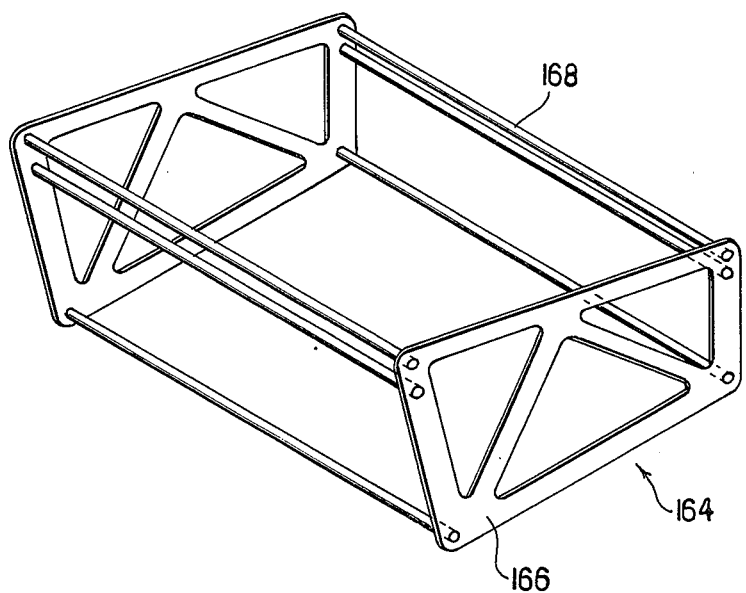

FIG. 21 is a partial view of a mandrel or frame onto which the element of FIG. 20 is positioned and supported.

Figure 22:
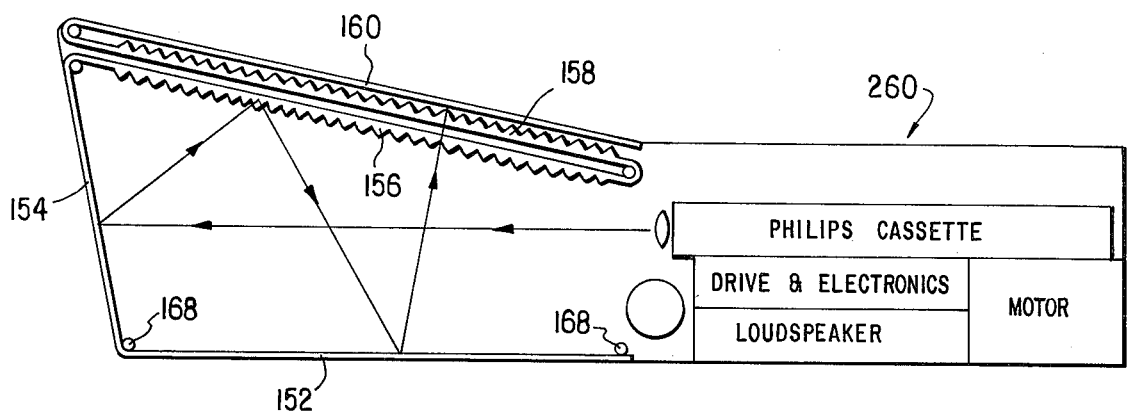

FIG. 22 is a partial schematic view of a self-contained and hand-held optical viewing unit.

Figure 23:
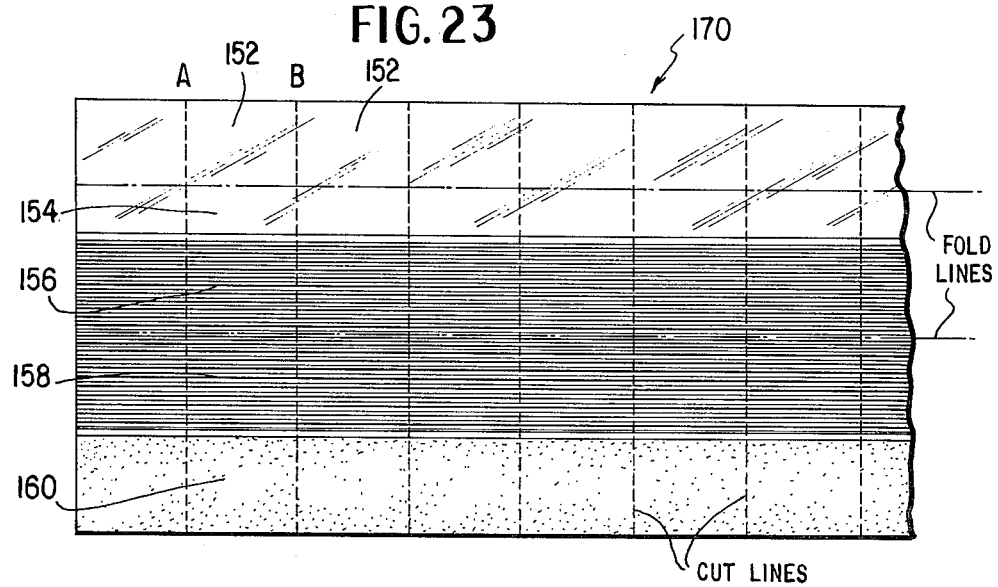

FIG. 23 is a plan view of a portion of a continuous plastic strip and illustrates one manner of manufacture of the device of FIG. 20.

Figure 24:
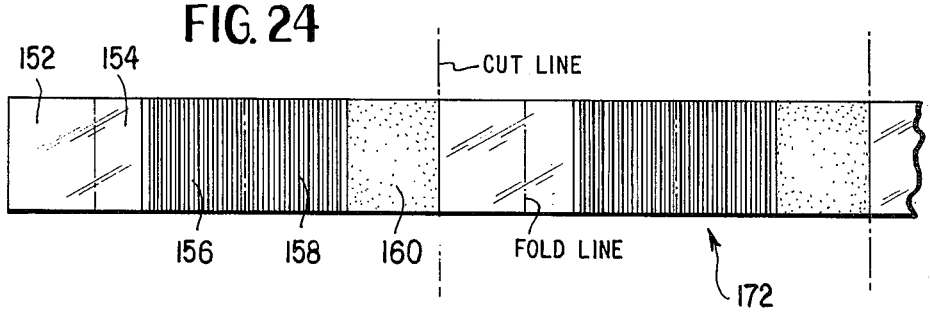

FIG. 24 is a view similar to FIG. 23 but showing an embodiment.

FIGS. 25 and 26 are partially schematic views illustrating another embodiment.

FIGS. 27 and 28 are partially schematic views illustrating another embodiment.

FIGS. 29 and 30 are partially schematic views illustrating another embodiment.

FIG. 31 is a partially schematic view illustrating another embodiment.

FIG. 32 is a partially schematic view illustrating another embodiment.

FIG. 33 is a partially schematic view illustrating a pair of cylindrical reflectors for yielding amorphic magnification of a projected light cone.

FIG. 34 is a partially schematic view of an optical projector provided with a pair of anamorphic reflecting surfaces (non-prism) such as those of FIG. 33.

Referring now to FIG. 1 of the drawings, a microfiche viewer or reader constructed according to one embodiment of the invention is schematically illustrated. The numeral 10 denotes a projection lens for projecting a microimage from a microfiche or other photographic reduction, the microfiche not being illustrated. The principal ray of the light cone projected from lens or lens system 10 is denoted by the numeral 12 and first strikes mirror 14. The ray then strikes second mirror 16 and thence third mirror 18 for final imaging and viewing on viewing screen 20. Pivot elements 22 and 24 are positioned as indicated relative to the final mirror 18 and the viewing screen 20. As shown at FIG. 2 of the drawings, the device is folded by first pivoting screen 20 about pivot 24 and then pivoting about pivot 22. The numeral 26 designates generally the indicated elements of the viewer. FIG. 3 is a perspective view indicating the general shape and proportion of the viewer when in the extended or viewing position. By a consideration of FIG. 2, the reader will easily comprehend that the cassette, its associate housing, optics, power supply and loudspeaker may be made as a separate, detachable module. In this manner, the user may operate the detachable module as a portable motion picture camera, then develop the film, then reinsert the module for viewing. The same is true for other cassette and motor combinations later to be described. In the event that the illumination system required for projection onto the viewing screen is not contained in the cassette module, a light tight trap door, normally closed in the recording phase, opens to allow the projection light to fall onto the developed film, through the optics, and onto the screen.

FIG. 4 illustrates another embodiment similar to that shown at FIGS. 1–3 except that the viewing screen lies in front of the projected light cone whose principal axis is denoted by the numeral 12. The reader will note the similarity to the embodiments of FIGS. 1–4 to a foldable viewer shown in U.S. Pat. No. 3,667,839 issued to Artaud. In that viewer a foldable arrangement is illustrated wherein projected light strikes two reflecting surfaces for subsequent imaging on a viewing screen. The device illustrated at FIGS. 1–4 of this application, however, displays the advantage of an additional reflecting surface to thereby obtain greater magnification. Further, the folding action in order to make the device more compact is different.

Referring now to FIG. 5 of the drawings, the numeral 30 denotes generally the principal optical elements of the Kapany device earlier mentioned. The numeral 31 denotes a solid block of transparent material through which a cone of light whose apex is denoted by the numeral 32 is projected. The cone of light represents lights from a microimage. The principal ray is denoted by the numeral 33 and strikes first reflecting surface 34. From thence it strikes, at more than a critical angle with respect to the perpendicular to the surface 35 of the solid and is thence reflected to reflecting surface 37. From here the light passes normally out through surface 35 for viewing. The reader will observe the extended dash lines adjacent the cone apex 32. They illustrate the bending action suffered by the light when it passes from air into transparent material 31.

Referring now to FIGS. 6 and 7 of the drawings, a compact optical viewer is illustrated which also employs a dual-function surface, but which is superior from the viewpoint of both size and cost. At FIG. 6 the numeral 12 again indicates the central ray from a projected cone of light which carries a microimage which is to be viewed. The ray first strikes reflecting surface 14 and then strikes prism sheet 44. It is then totally internally reflected at the upper surface of the prism sheet, as is the case with the Kapany surface 35, and thence strikes second mirror 16. From thence it exits normally to the prism sheet and thence to viewing screen 46. While shown as passing straight through prism sheet 44, the reader will understand that light from mirror 16 is refracted as it passes through the prism sheet, as shown at FIG. 7.

Reference now to FIGS. 6a and 6b will illustrate how the apex angle $\theta$ (theta) of each elongated prism 45 of the prism sheet should vary along the length of the prism sheet in order to reduce optical abberations. The reader will observe from FIG. 6 that, ideally, each light ray reflected from mirror 14 will strike a respective prism face (one of the two faces on prism 45) perpendicularly and will exit from the other prism face also perpendicularly. Because the various light rays reflected from mirror 14 strike the prism sheet 44 at different angles of incidence, such perpendicularity may be maintained by compensation, by varying the apex angle of the prisms. In general then, the apex angle will vary along the prism sheet length in a predictable manner, as shown by the following considerations. In FIG. 6a, the point V denotes the apparent point source of the light rays which strike the Fresnel prism sheet 44 after reflection from surface 14. The point V is of course imaginary but it represents the apex of the unfolded light cone and is employed as a convenience in demonstrating the prism apex variation. The point V is positioned a distance s laterally of the prism sheet 44 and a distance y from the intersection of (typical) reflected ray 13 and the prism sheet.

From FIGS. 6A and 6B, $$\tan i = y/s \quad (1)$$

$$d(\tan i) = di/\cos^2 i = dy/s \quad (2)$$

Hence, $$di/dy = \cos^2 i / S \quad (3)$$

$$\cos^2 i = S^2/S^2 + y^2 \quad (4)$$

Substituting Eq. (4) into (3) yields, $$di/dy = S/S^2 + y^2 \quad (5)$$

Since from FIG. 6B $$\theta = 180° - 2i \quad (6)$$

where $\theta$ is the apex angle of a prism 45

$$d\theta/dy = -2 di/dy \quad (7)$$

or, substituting Eq. (5) into Eq. (7)

$$d\theta/dy = -2S/S^2 + y^2 \qquad (8)$$

Hence, Eq. (8) shows the rate of change of the apex angle along the prism sheet.

We observe that $\theta$ itself is given by Eq. (6) where the value of i from Eq. (1) is substituted into Eq. (6), i.e., $$\theta = \pi/2 - (2\tan^{-1} y/s). \qquad (9)$$

Referring now to FIG. 7 of the drawings, a magnified portion of the screen and prism sheet of FIG. 6 is shown. The numeral 44 denotes the prism sheet, the numeral 46, the viewing screen, and the numeral 48, an air gap between the two. The prism sheet 44 is defined by a plurality of ridges which are on one surface of a sheet, with the ridges and the sheet being transparent. Each ridge has two faces, each face being generally straight in transverse cross-section (see FIG. 7, for example), although one or both of the two faces of any ridge may be curved. Further, the ridges may be of alternate straight and curved face construction. The ridges are next to and touch each other, i.e., there are no lands or spaces between them. It is necessary that the faces of the ridges be at an angle other than 90° to the plane of the prism sheet. The ridges in all of the prism sheets illustrated are straight and are parallel to each other. However, ridges having an elliptical contour, with the axis of the light cone defining one of the two foci of nested ellipses may be employed (see FIG. 8).

Referring now to FIG. 8 of the drawings, an embodiment of a prism sheet is illustrated. The prism sheet 44 is not to be confused with a Fresnel lens, to which it bears a superficial resemblance. The individual ridges which make up the prism sheet are elliptical in contour, although in transverse cross-section they are similar to the previously described embodiment. The ridges are denoted by the numeral 50, while the numeral 52 indicates the intersection of the principal ray 12 of the cone of light with the prism sheet. The reader will observe that point 52 is one foci of the nested elliptical ridges.

Referring now to FIGS. 9a and 9b of the drawings, two and four prism sheets are illustrated. In the event that only a single prism sheet is employed for the reader, such as shown at FIGS. 6 and 7, a viewing screen is placed adjacent the flat surface of the prism sheet. It has been found that if a high gain, highly directional viewing screen is used, it becomes necessary to use two prism sheets, such as shown in FIG. 9a, adjacent to the screen. Such high gain directional screens are well known and readily available. It has further been found that best optical results are possible if the space 60 between prism sheets is as small as possible, but not touching. However, if light passing through the first prism sheet is to be subsequently reflected, it is necessary to include a second prism sheet so as not to change the direction of the light rays. However, if the thickness of the prism sheet is too great, the image on the rear projection screen becomes badly distorted because of the crossing of the light rays as shown in FIG. 9a. But the distortion becomes negligible to the eye if the number of prisms is large, e.g., 200 prisms per inch. The distortion produced will not be resolved by the human eye.

In order to improve the image on the screen, a second pair of prism sheets can be placed immediately next to and in registry with the first two prism sheets, thereby undoing the crossing of rays as is shown in FIG. 9b. It is to be understood that in any of the embodiments shown herein utilizing a pair of prism sheets, the optics can be improved by adding an additional pair as in FIG. 9b.

In FIG. 9a the first prism sheet is denoted by the number 54 and includes surfaces 56 and 58 on a typical ridge. Air gap 60 is interposed between the flat surface of the prism sheet 54 and the flat surface of a second prism sheet 62. Faces 64 and 66 on a typical ridge of prism sheet 62 correspond with surfaces 56 and 58. The reader will note that surface 58 is parallel to surface 64, while surface 56 is parallel to surface 66. Further, any one or both of homologous surfaces 58, 64 may be curved, to effectively define a lens. Similarly, any one or both of homologous surfaces 56, 66 may also be curved to similarly effectively define a lens. In FIG. 9b, as well as in FIG. 9a, FIG. 7, and FIG. 6, it is preferable that the rays reflected from surface 14 (see FIG. 6) which strike the ridges of the first prism sheet do so in such a manner that the rays are substantially perpendicular to the entrance faces of the ridges, as shown at FIG. 6. Similarly, the light rays (again see FIG. 6), which are totally internally reflected at this first prism sheet and which thereafter pass out of the exit faces of the ridges do so in such a manner that they are substantially perpendicular to the exit faces of the ridges. In order for these conditions to prevail, the apex angle, i.e., the angle of intersection of the sides of each ridge at its peak, changes somewhat, along the prism sheet.

FIGS. 10 and 11 of the drawings illustrate another embodiment employing two projection lenses. At FIG. 11 the numerals 12 and 12' indicate the principal axes of two projected light cones, each light cone corresponding to a respective part of two parallel tracks carried by an optical film on a Philips cassette. The reader is denoted generally by the numeral 28' while the numeral 26 again represents, generally, the indicated auxiliary devices in a typical reader.

FIG. 12 illustrates another embodiment, similar to those previously described, wherein the compact reader can accommodate either a microfiche, such as a standard four inch by six inch microfiche or a Philips cassette. The microfiche is denoted by the numeral 70 and employs projection lens 10, while the cassette is denoted by the numeral 72 and employs projection lens 10'. The reader will understand that mirror 11 is pivoted out of the optical path when cassette 72 is employed. Thus, either the microfiche or the cassette may be used for projection.

Referring now to FIGS. 13 and 14, another modification of a compact viewer is illustrated. The numeral 76 denotes a first mirror for receiving a cone of light projected from a cassette or other carrier of optical information on a reduced scale. The numeral 78 indicates a second mirror while the numeral 80 indicates a third mirror. As before, the numeral 44 denotes a prism sheet while the numeral 46 indicates a viewing screen. The principal light ray is indicated by the numeral 12. The action of the device is similar to that previously described with respect to other embodiments. Here, however, the reflecting surfaces, particularly the first and second, are substantially parallel. As before, light striking prism sheet 44 at more than the critical angle is reflected, while light rays substantially normal to the prism sheet are transmitted through for viewing on screen 46.

The embodiment of FIG. 14 differs from that of FIG. 13 in that the former includes pivots 86 and 88 as well as additional mirror 82 coupled to viewing screen 84. The screen when not in use, is folded clockwise about pivot 88 until it attains parallelism with mirror 82, then these two elements are folded clockwise about pivot 86. Also, a pair of parallel and spaced prism sheets denoted by the numerals 54 and 62 are employed, their action and disposition being the same as that described with respect to FIG. 9 of the drawings.

Referring now to FIGS. 15 and 16, another modification is illustrated. The numeral 90 indicates a first mirror, the numeral 92 a second mirror, and the numeral 94 a third mirror. The numeral 96 indicates a viewing screen, while again the numeral 12 indicates the principal ray of a cone of light projected from a cassette or other information storage device. The viewing screen is provided with a pivot 98 connecting it to the top of mirror 94, while the bottom of mirror 94 carries pivot 100 which is also at the left portion of mirror 92 in FIG. 15. Numeral 102 indicates a transparent wheet such as a glass plate. The operation of the device will be apparent from a consideration of FIG. 15. In order to fold the device when not in viewing usage, screen 96 is pivoted about axis 98 in a clockwise direction until it is parallel to mirror 94. These two elements are then folded about pivot 100 in a counter-clockwise direction until they are parallel to mirror 92. Glass plate 102 is for the purpose of protecting the interior of the device when it is in the folded position. FIG. 17 indicates a similar construction, the main difference being in the manner of folding for storage and in the use of two dual-function prism sheets. Mirror 93 is the next to the last reflecting surface, while mirror 94 is the last reflecting surface. Again, the numeral 96 indicates the viewing screen while numeral 12 the principal ray. In order to fold the device of FIG. 17, mirror 94 is moved to the right so that its bottom portion slides along the top of the viewer, viewing screen 96 thus swinging about axis 100 in a clockwise manner.

Referring now to FIG. 18, another embodiment is illustrated of a compact reader according to the practice of this invention. The numeral 110 denotes a first reflecting surface, (neglecting any small mirrors near the apex of the projected light cone) the numeral 112 a second reflecting surface, while numeral 44 again represents a prism sheet with associated spaced viewing screen 46. The numeral 113 indicates a slot for the reception of a microfiche, although it will be understood that elements 26 may be modified so as to include a Philips cassette which carries optical information instead of the microfiche. A light cone projected from the stored micro information has a principal ray denoted by the numeral 12, as before, and strikes surfaces 110 and 112 as indicated. Reflecting surface 114 is positioned as shown, extending upward to the left as viewed at FIG. 18 until adjacent the left end of prism sheet 44. The dual-function action of prism 44 is the same as that previously described.

FIG. 19 illustrates a modification of the device shown at FIG. 18, the modification differing in the addition of another mirror 115 and viewing screen 116 which is attached to the top of mirror 15 by means of a pivot 120, mirror 115 in turn carrying a lower pivot 122. The optical action of the embodiment of FIG. 19 is believed evident. To fold the device, screen 116 is pivoted about axis 120 in a clockwise direction until it is in parallelism with mirror 115, the two elements are then folded in a clockwise direction about pivot 122 to the top of the device.

The prism sheets such as 44 of FIG. 7 and 54, 62 of FIG. 9a, which are employed in most of the embodiments described above, may be formed in the manner similar to that described with respect to FIGS. 10 and 11 of my copending U.S. patent application Ser. No. 714,225, filed Aug. 13, 1976, entitled Light Channeling Devices, and hereby incorporated by reference. A stack of generally rectangular shims of metal, are distorted so that the shims slide relative to each other. One set of edges of the shims thus assumes the staggered relation shown at FIG. 11 of the above noted copending application, except that the edges are not biased as shown by the numeral 72, but are still rectangular, as shown at FIG. 10. The edges are, further, not as distant from each other as shown at FIG. 11, and instead are displaced an amount to produce an edge cross-section the same as that of prism sheet 44 of FIG. 7 of this application. Again, the shim edges are mirror polished. The resultant shim assembly may now be employed either as a mold or as a master for electro-forming. The mirror polished shim ends yield the desired optically flat surfaces of the individual ridges of the prism sheet, such as flat surfaces or faces 56, 58 of prism sheet 54 of FIG. 9a of this application.

It will be apparent that in any of the several embodiments of the invention, recording of information may be done by the reverse of the projection of information already described. Thus, the viewing screen is first removed and then a transparency (to be recorded) is placed on the viewing screen, the transparency illuminated from the rear, and recordation made on virgin film carried by the cassette.

Referring now to FIG. 20 of the drawings, the numeral 150 denotes a folded plastic sheet formed of a transparent material such as methyl methacrylate. The sheet is depicted without its supporting framework for purposes of explanation. The numeral 152 denotes a first panel or zone of the plastic sheet and is coated on one side thereof with a reflective material, such as aluminum. The numeral 154 denotes a second panel or zone also coated with a similar reflecting material. The numeral 156 denotes a third panel or zone and is provided with integral, upstanding elongated ridges on one side, entirely similar to ridges 54 of FIG. 19. Numeral 158 denotes a fourth sheet panel or zone provided on one surface thereof with a similar plurality of elongated ridges, entirely similar to ridges 62 of the embodiment of FIG. 19. Numeral 160 denotes a fifth panel or zone, provided, for example, with particulate material on one surface thereof so as to define a viewing screen, i.e., a screen of the type which diffuses light passing therethrough. The plastic sheet 150 of FIG. 20 is wrapped around a framework or mandrel 164 (FIG. 21) which includes side members 166 and a plurality of parallel and elongated rods 168.

Referring now to FIG. 22 of the drawings, the numeral 60 denotes a self-contained, hand-held viewing unit similar in general construction to the unit 26 illustrated at FIG. 10 of the drawings. The reader will immediately recognize that the sheet 150 of FIG. 20 and its supporting mandrel 164 of FIG. 21 are positioned in unit 260 and operate in a manner entirely similar to that described with respect to several of the previously described embodiments. Thus, light carrying small images projected from the cassette film in the Philips cassette impinges upon reflecting surface of panel 154, thence to prism sheet element 156, thence to the reflecting surface of panel 152 and thence substantially normally through prism elements 156 and 158 to viewing screen 160 where it is read by the user.

Referring now to FIG. 23 of the drawings, one method of making the plastic strip 150 shown at FIG. 20 is illustrated. The numeral 170 denotes a plastic strip or web of indefinite length of methyl methacrylate. Approximately the upper third of the web or ribbon is continuously coated to define a horizontal band of a reflective coating on one surface of the ribbon. Any one of a number of known reflective coatings may be employed, as any one of a great number of processes for such application. The middle horizontal portion of ribbon 170 is provided (as by embossing or any other convenient manner) with a plurality of parallel ridges which will later define a prism sheet or prism assembly, as in the manner of elements 54 and 62 of FIG. 19. The lowermost portion of the band 170 is coated with a material to impart light scattering properties to the plastic. For example, particulate material may be deposited along this zone. The reader will understand that these several operations on ribbon 170 as shown at FIG. 23 are applied continuously as by roller elements, sprays, etc., as the ribbon moves along its own longitudinal axis. After these operations have been carried out, the ribbon is cut transversely, indicated by typical cuts A and B, to thereby define individual strips. These strips, when bent, each define the article of manufacture 150 illustrated at FIG. 20 of the drawings. The reader will readily observe that the first fold line on the upper portion of ribbon 170 will define the two panels 152 and 154 and that another fold line will define panels 156 and 158. Finally, still another fold will define viewing screen 160.

FIG. 24 of the drawings illustrates an alternative mode of manufacture, where the numeral 172 denotes a ribbon of indefinite length, entirely similar to ribbon 170. The difference is that the ribbon is not as wide and that the several regions 152, 154, etc., are formed in a cyclic manner along the ribbon length between portions designated as C and D. A length corresponding to the portion C-D is then cut and the folding operation above described takes place to form the article shown at FIG. 20.

Another embodiment of the invention is illustrated at FIGS. 25 and 26. In FIG. 25, a normal cone of light from a point source O to a viewing screen is illustrated. In the several previous embodiments of the invention, it is this light cone which has been bent by reflection for final transmission to a viewing screen. In FIG. 25, a reduced cone of light is shown and extends from the origin to a magnifying mirror denoted by the numeral 173. From here, the cone of light diverges and finally strikes the same area of the viewing screen as before. As will soon be apparent FIG. 25 is schematic in the sense that the reduced cone of light is reflected from and not transmitted through the magnifying mirror 173. The legend—reduction—in FIG. 25 illustrates the difference in width or diameter of the cone between the normal cone and the reduced cone. A consideration of the several embodiments previously described will show that the narrower the cone of light, then the narrower the entire compact reading device may be. Accordingly, the narrower the beam of light from the object the more utility the device will display in the sense as not being as bulky as otherwise would be the case. The function of the magnifying mirror 173, somewhat schematically illustrated at FIG. 25, is to permit the use of a reduced diameter cone of light. After striking and being reflected from element 173, the reduced cone of light diverges so as to occupy the same viewing screen area as would have been the case were the conventional, flat reflecting elements of previously embodiments.

Reference now to FIG. 26 will illustrate the new construction according to this embodiment. Light from an object, in the form of cone, for example, strikes magnifying mirror 173. This mirror may be a Fresnel mirror or an aspheric mirror, both of which are well known to workers in the optic arts. After striking mirror 173, the light strikes one prism sheet 174, (of the same construction as that previously described) and is hence reflected to mirror 178. The light is reflected from mirror 178 and strikes prism sheet 174 at an angle greater than the critical angle and hence the light as before passes through prism sheet 174 onto prism sheet 176. From here, it passes to viewing screen 180. The reader will recognize that elements 174, 176 and 180 are completely similar to prism sheets 156, 158 and viewing screen 160, for example of FIG. 22. A comparison of the action of the embodiment shown in FIG. 26 with those of, for example, shown at FIGS. 6 and 10, would immediately reveal, that the light cone being smaller in diameter in the embodiment of FIG. 26, the width or the thickness of the optical reader is correspondingly lessened. This, of course, enhances the utility of the optical device, namely, a device for reading out optical information which approaches the relative thinness of a book. The action of magnifying mirror 173 is to compensate for the narrowed width or diameter of the light cone projected from the micro-intelligence for ultimate viewing on screen 180.

Reference now to FIGS. 27 and 28 will illustrate still another embodiment. The correspondence between FIGS. 25 and 27 will be apparent, namely, both are somewhat schematic representations illustrating the diminution of the light cone made possible when a magnifying mirror 173 is employed. Again, a reduced cone strikes magnifying mirror 173 and, by reflection, the cone is spread so as to extend over an area the same as that would have been defined by the use of a so-called normal cone. In FIG. 28, light from an object O first strikes reflecting surface 182, then the initial prism sheet 174. Light reflected now strikes magnifying mirror 173 for subsequent transmission through elements 174, 176, and viewing screen 180. A difference in the construction between FIGS. 26 and 28 is that the magnifying mirror in FIG. 28 is the penultimate reflecting surface, while in FIG. 26 it is the first reflecting surface.

Referring now to FIGS. 29 and 30, still another embodiment is illustrated, which also employs a magnifying mirror of the type shown in FIGS. 25-28. Again, FIG. 29 illustrates the difference in cone diameter which is obtained by the use of a magnifying miror. In FIG. 29, the reader will observe that the relative reduction between the normal cone and the reduced cone is greater than in FIG. 25 or 27. The reason for this is that an additional reflecting surface is employed, and here the attention of the reader is invited to FIG. 30. In FIG. 30, light in the form of a cone is seen as emanating from an object and strikes first reflecting mirror 184. From here it strikes a second mirror 186, then prism sheet 174 and then magnifying mirror 173 prior to final transmission to the viewing screen 180.

Referring now to FIG. 31 of the drawings, still another embodiment is illustrated. This embodiment is very nearly identical to that of FIG. 30. Namely, a light cone defined by light rays from an object strikes a first reflecting surface 188, then a second reflecting surface 190, then the prism sheet 174 and then magnifying mirror 173 prior to final transmission to the viewing screen 180. The difference between the constructions shown at FIGS. 30 and 31 is the location of the incoming rays of light from the object. In FIG. 30, the rays pass between the second mirror 186 and the viewing screen 180, while in construction of FIG. 1 the light rays pass between the magnifying mirror 173 and the second reflecting mirror, here mirror 190.

Reference now to FIG. 32 the drawings will illustrate another embodiment employing a different arrangement of mirrors. In FIG. 32, the numeral 192 indicates the first reflecting surface, mirror 194 the second reflecting surface, while elements 174, 173, 176 and 180 play the same role and perform the same function as previously explained.

In the previously described embodiments, the microinformation or other information on a reduced scale which is to be projected and read by the optical reader of this invention has been undistorted. That is to say, the relative dimensions of the reduced image are in the same proportion as that of the real object. In the art of photographic recording, it is known that photographic images may be obtained wherein the ratio of the lengthwise dimensions to the breadthwise dimensions is different from that of the object itself. Such images are often termed anamorphic. Such images are often employed, for example, in large screen projection such as motion picture projection apparatus. The technology of anamorphic image recordation and projection is well-known in the optic arts, as may be seen, for example, from U.S. Pat. No. 2,769,373 issued to Albert Bouwers. As part of my invention, I have discovered that anamorphic images may be employed with optical readers of the type which have been above described. FIGS. 33 and 34 illustrate the use of anamorphic photography in connection with the readers previously described. In FIG. 33, a first reflecting surface 200 is illustrated and is concave, having been generated by a radius of curvature $R_1$. The reader will understand that mirror 200 is a segment of a cylindrical mirror. Similarly, the numeral 202 denotes a corresponding convex segment of a cylindrical mirror having a generating radius $R_2$. The reader will further observe that the focal lines of both cylindrical mirrors approximately coincide. Typical light rays reflected by surfaces 200 and 202 are illustrated. In FIG. 34, mirror 204 corresponds to mirror 200 of FIG. 33, while convex mirror 206 corresponds to mirror 202. The operation of the embodiment shown in FIG. 34 is believed obvious from the descriptions previously given of similar apparatus. The reader will understand that information projected from microimages in connection with the embodiment of FIG. 4 has itself previously been made in the form of anamorphic images, by known techniques, so that upon complete projection and read out, the original proportion between length and width is realized. Because the dimension of the projected light cone from the microinformation, in a direction perpendicular to the plane of the paper is not particularly significant, the other dimension of the light cone, namely, the dimension parallel to the plane of the paper may be reduced by anamorphic optical techniques. The purpose of this, again, is to reduce the thickness of the reader.

What is claimed is:

1. An optical projector of the type for projecting a cone of light from an illuminated microimage, including, a plurality of reflecting surfaces for intercepting and folding a cone of light, one of said reflecting surfaces reflecting light incident thereon at angles greater than a critical angle but which transmits light therethrough for any light incident thereon at angles less than the critical angle, characterized by, the one said reflecting surface defined by a prism sheet, and a viewing screen parallel and adjacent to but spaced from the prism sheet.

2. The projector of claim 1 wherein the said prisms define one surface of a transparent sheet.

3. An optical projector of the type for projecting a cone of light from an illuminated microimage, including, a first reflecting surface for intercepting a projection light cone at an angle other than 90° to the axis of the cone, a second reflecting surface at an acute angle with respect to the first mirror surface, a third reflecting surface making an obtuse angle with respect to the first reflecting surface, the second reflecting surface being generally parallel with the sides of the cone of the projected light, the second reflecting surface reflecting any light incident thereon from the first reflecting surface which is at an angle greater than a critical angle but transmitting any light incident thereon less than the critical angle, characterized by, the second surface defined by a series of prisms whose apices face generally toward the third reflecting surface and whose bases are parallel to the second reflecting surface.

4. The projector of claim 3 including a second series of prisms, identical to the first mentioned series of prisms, the elements of the second prism series having their apices oppositely directed with respect to the apices of the elements of the first mentioned prism series the first and second prism series each defining a plane, the planes being substantially parallel and adjacent to but spaced from each other.

5. The projector of claim 3 wherein the optical path of a cone of light striking the said reflecting surface passes everywhere through air, except when passing through the prisms.

6. The projector of claim 1 wherein the optical path of a cone of light striking the said reflecting surface passes everywhere through air, except when passing through the prisms.

7. The projector of claim 4 including a third and fourth series of prisms, each third and fourth series being identical to that of the first and second prism series, the third and fourth series positioned relative to each other in the same manner as the first and second series are positioned relative to each other, the third and fourth prism series each defining a plane, the planes of each of the third and fourth prism series being arranged between the first and second prism series and the viewing screen.

8. An optical projector of the type for projecting a cone of light from an illuminated microimage, including a pair of reflecting surfaces which intercept and reflect a cone of light, the intersection of the center of the light cone with the first reflecting surface being farther away from the apex of the cone than the intersection of the center of the light cone with the second reflecting surface, a third reflecting surface, said third reflecting surface being pivoted at one edge thereof about an axis perpendicular to the axis of the light cone, the third reflecting surface carrying a viewing screen pivoted to an opposite edge of said third reflecting surface, the viewing screen being pivotable to a position parallel and adjacent the third reflecting surface, the axes of the two said pivots being parallel to each other.

9. An optical projector of the type for projecting a cone of light from an illuminated microimage, including, first and second substantially parallel mirrors, said first mirror positioned with an edge adjacent the edge of a third mirror, the first and third mirrors making an obtuse angle with each other, a prism sheet positioned in the plane of the second mirror and adjacent thereto, the prism sheet positioned opposite to the third mirror and adapted to reflect at least a portion of light received from the first mirror while transmitting at least a portion of the light received from the third mirror, a viewing screen parallel, contiguous to, but spaced from the prism sheet.

10. An optical projector of the type for projecting a cone of light from an illuminated microimage, including, first and second substantially parallel mirrors, said first mirror positioned with an edge adjacent to the edge of a third mirror, the first and third mirrors making an obtuse angle with each other, a first prism sheet positioned in the plane of the second mirror and adjacent thereto, the prism sheet positioned opposite to the third mirror, a second prism sheet adjacent and parallel to but spaced from the first prism sheet, a fourth mirror, said fourth mirror being pivoted at one edge thereof about an axis perpendicular to the axis of the light cone, the fourth mirror carrying a viewing screen pivoted to an opposite edge of the fourth mirror, the viewing screen being pivotable to a position parallel and adjacent the fourth mirror, the axes of the two said pivots being parallel to each other.

11. An optical projector of the type for projecting a cone of light from an illuminated microimage, including, first and second substantially parallel mirrors, a third mirror positioned substantially normal to the first and second mirrors, a viewing screen at an angle with respect to the third mirror, the viewing screen pivoting to one edge of the third mirror, the third mirror pivoted to one of said first and second mirrors.

12. An optical projector of the type for projecting a cone of light from an illuminated microimage, including, first and second mirrors substantially orthogonal to each other, a prism sheet generally orthogonal to the second mirror, a third mirror, the third mirror making an acute angle with a plane which contains the prism sheet, the plane of the third mirror passing substantially through the intersection of the first and second mirrors, a viewing screen parallel and adjacent to, but spaced from, the prism sheet.

13. An optical projector of the type for projecting a cone of light from an illuminated microimage, including, first and second mirrors generally orthogonal to each other, a first prism sheet substantially orthogonal to the second mirror, a third mirror, the third mirror making an acute angle with a plane which contains the prism sheet, the plane of the third mirror passing substantially through the intersection of the first and second mirrors, a second prism sheet parallel and adjacent to, but spaced from, the first prism sheet, a fourth mirror one edge of which is pivoted adjacent the intersection of the third mirror and the prism sheets, a viewing screen pivoted to the fourth mirror at an edge of the fourth mirror, the axes of the two pivots being parallel to each other.

14. An optical projector of the type for projecting a cone of light from an illuminated microimage, including, a plurality of reflecting surfaces for intercepting and folding a cone of light, one of said reflecting surfaces reflecting light incident thereon at angles greater than a critical angle but which transmits light therethrough for any light incident thereon at angles less than the critical angle, characterized by the one said reflecting surface defined by a prism sheet, a second prism sheet adjacent and parallel to but spaced from the first prism sheet, a final reflecting surface, said final reflecting surface being pivoted at one edge thereof about an axis perpendicular to the axis of the light cone, the final reflecting surface carrying a viewing screen pivoted to an opposite edge of the final reflecting surface, the viewing screen being pivotable to a position parallel and adjacent to the final reflecting surface, the axes of the two said pivots being parallel to each other.

15. An optical projector of the type for projecting a cone of light from an illuminated microimage, a plurality of reflecting surfaces for intercepting and folding a cone of light, one of said reflecting surfaces being a prism sheet which reflects light incident thereon at angles greater than a critical angle but which transmits light therethrough for any light incident thereon an angles less than the critical angle, a viewing screen parallel and adjacent to but spaced from the prism sheet, one of said reflecting surfaces, but not the prism sheet, being a magnifying mirror, light reflected from the magnifying mirror increasing the cone angle of the projected cone of light, whereby the thickness of the optical projector is lessened.

16. The optical projector of claim 15 wherein the said magnifying mirror is the last of the said reflecting surfaces.

17. The optical projector of claim 15 wherein the said reflecting surfaces are defined by the said prism sheet, the said magnifying mirror, and two mirrors, the arrangement being such that a cone of light incident on one of the two mirrors is reflected to the other mirror, thence to the prism sheet, thence to the magnifying mirror, and thence to the prism sheet, whereby the cone of light is reflected at least four times prior to impingement on the viewing screen.

18. An optical projector of the type for projecting a cone of light from an illuminated microimage, including a plurality of reflecting surfaces for intercepting and folding a cone of light, one of said reflecting surfaces being a prism sheet which reflects light incident thereon at angles greater than a critical angle but which transmits light therethrough for any light incident thereon at angles less than the critical angle, a viewing screen parallel and adjacent to but spaced from the prism sheet, two of the said reflecting surfaces, excluding the prism sheet, being anamorphic, whereby magnification of the projected light cone by the anamorphic reflecting surfaces does not occur along one axis of the viewing screen but does occur along an axis orthogonal to the said one axis of the viewing screen.

19. The optical projector of claim 18 wherein the said two anamorphic reflecting surfaces are cylindrical.

* * * * *